US011603810B2

(12) United States Patent
Arnau Martínez et al.

(10) Patent No.: US 11,603,810 B2
(45) Date of Patent: Mar. 14, 2023

(54) INTERNAL COMBUSTION ENGINE AND OPERATING METHOD OF SAME

(71) Applicants: Universitat Politécnica de Valéncia, Valencia (ES); Consejo Superior de Investigaciones Científicas (CSIC), Madrid (ES)

(72) Inventors: Francisco José Arnau Martínez, Valencia (ES); Jesús Vicente Benajes Calvo, Valencia (ES); David Catalán Martínez, Valencia (ES); José María Desantes Fernández, Valencia (ES); Luis Miguel García-Cuevas González, Valencia (ES); José Manuel Serra Alfaro, Valencia (ES); José Ramón Serrano Cruz, Valencia (ES)

(73) Assignees: UNIVERSITAT POLITÉCNICA DE VALÉNCIA, Valencia (ES); CONSEJO SUPERIOR DE INVESTIGACIONES CIENTÍFICAS (CSIC), Madrid (ES)

( * ) Notice: Subject to any disclaimer, the term of this patent is extended or adjusted under 35 U.S.C. 154(b) by 57 days.

(21) Appl. No.: 17/442,171

(22) PCT Filed: Mar. 21, 2020

(86) PCT No.: PCT/ES2020/070199
§ 371 (c)(1),
(2) Date: Sep. 23, 2021

(87) PCT Pub. No.: WO2020/193833
PCT Pub. Date: Oct. 1, 2020

(65) Prior Publication Data
US 2022/0178333 A1    Jun. 9, 2022

(30) Foreign Application Priority Data

Mar. 28, 2019    (ES) .............................. ES201930285

(51) Int. Cl.
F02M 25/12    (2006.01)
B01D 53/22    (2006.01)
(Continued)

(52) U.S. Cl.
CPC .......... *F02M 25/12* (2013.01); *B01D 53/228* (2013.01); *C01B 13/0255* (2013.01);
(Continued)

(58) Field of Classification Search
CPC ............ F02M 25/12; F02M 35/10157; F02M 37/0047; B01D 53/22; B01D 53/228;
(Continued)

(56) References Cited

U.S. PATENT DOCUMENTS 6,247,316 B1 *  6/2001  Viteri ...................... F01K 21/04
                                                                60/683
9,371,755 B2 *  6/2016  Hamad ..................... F01N 5/02
(Continued)

*Primary Examiner* — Loren C Edwards
(74) *Attorney, Agent, or Firm* — Wiggin and Dana LLP

(57) ABSTRACT

The invention relates to an internal combustion engine that comprises a first Brayton cycle comprising a mixed ionic-electronic conducting (MIEC) membrane that separates the $O_2$ from the air such that the suctioned air current is free from $N_2$; a second Brayton cycle combined in a binary manner with the first Brayton cycle and nested with a cycle selected from an Otto cycle and a diesel cycle performed by means of oxy-combustion. The second Brayton cycle transmits mechanical energy and thermal energy from exhaust gases to the first Brayton cycle. The first Brayton cycle provides to the second Brayton cycle compressed $O_2$ from the MIEC membrane. By means of the present engine, the NOx emission into the atmosphere is prevented by the separation of $N_2$ in the MIEC membrane.

20 Claims, 12 Drawing Sheets

(51) Int. Cl.
  *C01B 13/02*  (2006.01)
  *F02B 29/04*  (2006.01)
  *F02B 33/06*  (2006.01)
  *F02B 37/04*  (2006.01)
  *F02B 75/10*  (2006.01)
  *F02M 35/10*  (2006.01)
  *F02M 37/00*  (2006.01)

(52) U.S. Cl.
  CPC .......... *F02B 29/0406* (2013.01); *F02B 33/06* (2013.01); *F02B 37/04* (2013.01); *F02B 75/10* (2013.01); *F02M 35/10157* (2013.01); *F02M 37/0047* (2013.01); *C01B 2210/0051* (2013.01)

(58) Field of Classification Search
  CPC .......... B01D 2256/12; B01D 2257/102; B01D 2257/504; C01B 13/0251; C01B 13/0255; C01B 2210/0046; C01B 2210/0051; C01B 2210/0075; F02B 29/0406; F02B 33/06; F02B 33/22; F02B 37/04; F02B 75/10
  USPC ....................................................... 60/605.1
  See application file for complete search history.

(56) References Cited

U.S. PATENT DOCUMENTS

2017/0074213 A1\*  3/2017  Hamad .................. F02M 26/04
  2019/0203633 A1\*  7/2019  Cheeseman ............. F02B 21/02

\* cited by examiner

INTERNAL COMBUSTION ENGINE AND OPERATING METHOD OF SAME

CROSS REFERENCE TO RELATED APPLICATIONS

This application is a national phase entry under 35 U.S.C. § 371 of International Application PCT/ES2020/070199, filed Mar. 21, 2020, which claims the benefit of Spain Application No. 201930285 filed Mar. 28, 2019, all of which are herein incorporated by reference in their entirety.

FIELD OF THE INVENTION

The present invention relates to the field of the internal combustion engines, and more specifically to an internal combustion engine that burns hydrocarbons and does not emit gases that are harmful to health.

BACKGROUND OF THE INVENTION

MIEC Membranes

Mixed ionic-electronic conducting (MIEC) membranes are a type of dense ceramic membranes in which oxygen ions are diffused from one side to the other through the properties of the crystal structure due to a chemical potential gradient of oxygen between both sides of the membrane. The oxygen selectivity of these membranes is 100%. These membranes work at high temperatures (usually in the range of 700-1000° C.) with high air pressures (1-2 MPa) fed in on the retention side and vacuum on the permeation side, according to Air Products & Chemicals Inc., which has resulted in a major breakthrough for marketing MIEC membrane technology for pure oxygen productions.

Transport of the oxygen ion is simultaneous to the transport of electrons or electron holes (electron carriers), so the material must possess sufficient electron conductivity under membrane operating conditions. The driving force responsible for oxygen transport through the membrane is the difference in partial oxygen pressure between both sides of the membrane. Oxygen flow through a membrane is thereby determined by the temperature and the difference in partial oxygen pressure in addition to the thickness of the membrane.

Another crucial step in the oxygen separation process in ion transport membranes is gas exchange. As mentioned, transport through the selective separation layer consists of the diffusion of oxygen ions and electron carriers. Therefore, two surface reactions are necessary, a first reaction in which gaseous oxygen is adsorbed and transformed into oxygen ions on the surface of the membrane exposed to the feed gases, generally compressed air, and a second reaction in which the oxygen ions are transformed into molecular oxygen and desorbed. For different reasons, these transport steps can be limiting and produce a decrease in the permeation flow through the membrane. The following can be highlighted among the different possible reasons: (1) the thickness of the selective separation layer is very small, such that diffusion through the solid is much faster than the gas exchange. Usually, this critical dimension is referred to as the "characteristic length" and it is the ratio between the coefficient of diffusion and the kinetic constant of the surface gas exchange reaction under the operating conditions and the composition of gases in contact with the surface of the membrane. (2) The surface of the membrane does not possess any significant catalytic activity for the oxygen activation reaction. (3) The gaseous atmospheres in contact with the surface or surfaces of the membrane work against the adsorption/desorption of molecular oxygen and its release through the reaction $O_2 + 2\,e^- \rightarrow O^{-2}$. In processes that are relevant from the industrial perspective, both the permeate and the feed usually present significant amounts of acid gases such as $CO_2$ and $SO_2$ which hinder said reaction since they passivate or inactivate the surface and compete with the adsorption and reaction centers involved in the gas exchange reaction of oxygen. This harmful effect becomes accentuated as the process operating temperature drops, particularly below 850° C., and when the concentration of $SO_2$ and $CO_2$ is increased. The effect of $SO_2$ gas is particularly negative, since concentrations above 5 ppm produces serious effects on the oxygen permeation through the membrane.

The difference in partial oxygen pressure between both sides of the membrane can be reached through two actions: (a) by increasing the air pressure through compression steps; and/or (b) by decreasing the partial oxygen pressure in the permeate, which is possible by applying a vacuum, diluting oxygen in the permeate by means of an entrainment gas current or consuming oxygen in the entrainment chamber. This latter option normally consists of recirculating outlet gases from the combustion furnace or boiler, while at the same time increasing the operating temperature. Likewise, in line with the second option, it is possible to pass a reducing gas (generally methane or other hydrocarbons) which consume the oxygen that penetrates through the membrane in order to yield complete or partial combustion products and to release heat directly in contact with the membrane ceramic.

To understand MIEC membranes, five classification criteria based on the crystal structure, the phase composition, the chemical composition, the geometry and the dense layer configuration are normally used.

Considering their crystal structure, MIEC membranes can be classified as perovskite, membranes derived from advanced perovskites, and fluorites. Most MIEC membranes have a perovskite-type crystal structure ($ABO_3$), where A is a large sized cation and B is a smaller cation. A perovskite is a crystal lattice made up of $BO_6$ octahedrons with A ions located in 12 interstitial spaces. Some MIECs have a perovskite-like crystal structure, such as the of Ruddlesden-Popper (R-P) membranes with a formula of $A_{n+1}B_nO_{3n+1}$ (n=1, 2, 3, . . . ). The crystal structure of this phase is similar to the crystal structure of perovskite in which a number of perovskite blocks (n) have a corner shared with the $BO_6$ octahedron modified with the AO layer along axis c. Some MIECs have a fluorite structure, with the standard example being materials based on $CeO_2$.

If the membranes only have one type of crystalline phase, they are single-phase membranes. Most perovskite membranes are single-phase membranes, for example, $La_{1-x}Sr_xCo_{1-y}Fe_yO_{3-\delta}$ (0<x<1; 0< and <1). If the membrane has two phases and both of them contribute to oxygen permeation, they are dual-phase membranes. An example would be YSZ-Pd membranes, containing a fluorite, YSZ, for transporting oxygen ions and a metallic phase, Pd, for transporting electrons. If the membrane has two or more phases and only one of them contributes to oxygen permeation, they are a membrane made of a composite material. The inert phase is added to improve some property of the material (the mechanical strength, for example). For example, the composite material $SrCo_{0.8}Fe_{0.2}O_{3-\delta}$—$SrSnO_3$ comprises two perovskites, where the $SrSnO_3$ phase is inert with respect to oxygen permeation, but it improves the mechanical properties of the membrane.

At the start of the development of perovskite-type membranes, studies focused on those that incorporated Co at the site of crystalline position B because membranes based on Co have high oxygen conductivity (for example, in $Ba_{0.5}Sr_{0.5}Co_{0.8}Fe_{0.2}O_{3-\delta}$). Nevertheless, cobalt cations can be readily reduced to a lower valence state due to the weak Co—O bonds, being unstable in reducing environments. Therefore, Co-free perovskites have been developed. For example, $BaCe_{0.05}Fe_{0.95}O_{3-\delta}$ presents lower oxygen conductivities compared with the respective perovskite based on Co but presents higher stabilities even in $H_2$ at high temperatures.

The most common geometries are planar, tubular and hollow fiber membranes. Finally, considering the dense layer configuration, when membranes are made up of a single membrane layer presenting a thickness sufficient for supporting the integrity of the membrane, they are self-supporting membranes, and when dense membrane layers present a porous layer which allows smaller thicknesses to be used since the integrity of the membrane is supported by the porous layer they are asymmetrical membranes.

For practical use, the membranes for separating oxygen at a high temperature through ionic transport are generally formed by the following components:

i. A porous support, generally made of either the same material from which the separation layer is made or else from a (ceramic or metallic) material compatible with the separation layer. Compatible means that it has a similar expansion profile depending on the temperature and that a reaction does not take place between both phases at high temperatures to give rise to third phases, which generally result in the degradation and tearing of the membrane. The porosity of the support is usually comprised between 20 and 60%, and its thickness is variable, usually below 2 mm.

ii. A non-porous layer or film, preferably with a thickness of less than 150 μm is positioned on the porous support. This layer is made up of oxides or mixtures of oxides and allows the simultaneous transport of oxygen ions and electron carriers therethrough.

iii. A porous layer with a thickness preferably between 100 and 10 μm, made of a material having mixed ionic and electronic conductivity while at the same time catalytic activity for the adsorption/desorption of oxygen and the dissociation and ionization thereof is adhered on the non-porous layer. This catalytic layer allows the processes of incorporating and eliminating gaseous oxygen to be improved.

In some cases, there is an additional porous catalytic layer between the porous support and the non-porous separation layer having the function of improving the gas exchange steps, particularly when the porous support does not present catalytic activity or allow the transport of oxygen ions or electron carriers. Generally, the properties of the porous support and the additional porous catalytic layer are fairly similar, even though the specific surface area of the porous support is generally larger.

Optionally, another additional non-porous layer (v) may also be necessary. This layer would be positioned between the non-porous layer and the porous layer and serve as protection of the separation layer against possible degradation reactions or interactions in contact with the layer (iii) or with the gases in contact with the porous layer. This additional layer must allow the transport of oxygen ions and oxygen carriers while at the same time be thermally and chemically compatible with adjacent layers and with the gases with which it is in contact.

Oxy-Combustion

Oxy-combustion consists of the use of a current of highly pure $O_2$ as an oxidizing agent instead of air, as is performed in conventional combustion processes, thereby reaching higher flame temperatures with a lower fuel consumption and thus improving combustion. The use of oxygen-rich oxidizing agents makes it possible to obtain combustion gases with a composition mainly consisting of $CO_2$ and water vapor. The high concentration of $CO_2$ in outlet gases in the oxy-combustion process facilitates the potential separation thereof (see, for example, documents US20070175411A1, US20070175411A1, U.S. Pat. No. 9,702,300B2, CN102297025A).

Oxygen membranes based on silicones or polysulfones can also be applied to enriching the air, such that concentration of oxygen of 21% is increased to higher values, usually above 24%.

Oxy-combustion aims to be one of the most cost-effective technologies for the capture of $CO_2$, with its main drawback being that it has a high demand for $O_2$ and the cost that obtaining it entails. The huge challenge with this technology is in the production of $O_2$ in order to successfully supply the high amounts required.

In membrane reactors, membranes are introduced for the following purposes: selective extraction of reagents, retention of the catalyst, dosing of a reagent, support of the catalyst. All this entails increases in the efficiency of reactions in systems limited by thermodynamic equilibrium, preventing secondary reactions, protecting the catalyst against possible compounds that deactivate it, etc.

$CO_2$ Membranes

There is currently a large variety of materials which allows the selective passage of $CO_2$. These materials range from advanced polymers to different types of inorganic materials. Despite this differentiation, there are combinations of these materials in so-called mixed matrix membranes which generally consist of polymer matrices with inorganic particles dispersed in the matrix. This type of technology provides flexibility to the capture of $CO_2$, which allows acting before or after combustion. However, materials of this type are generally permeable to more gases, for example, $N_2$, $O_2$, $H_2$, etc. For this application, it is necessary for the main permeability to be in relation to $CO_2$, and, additionally, for $O_2$ and $N_2$ permeability to be negligible. There are various technologies for separating $CO_2$ from the rest of the gases:

a. Technology of Separating $CO_2$ by Means of Polymer Membranes

There are different polymers which allow the selective separation of $CO_2$ from a gas current. The application of polymers to the capture of $CO_2$ is attractive from the economic perspective due to the low cost and the ease of synthesis and processing of the polymers, but they are generally limited materials due to their chemical, mechanical, and thermal stability, and due to their low permeability. A standard upper limit of 50 has been established for the $CO_2/N_2$ cross-selectivity. Generally, materials of this type work at low temperatures and intermediate pressures (1-5 bar):

Among the different available polymers, the following must be emphasized: (i) cross-linked polyethylene oxides (XLPEO) with permeabilities of 420 barrer and selectivity for $CO_2/CH_4$ of 18 at 35° C. (barrer=$10^{-10}$ $cm^3(STP)\cdot cm/(cm^2\cdot s\cdot cmHg)$), (ii) polymers based on polyamides, such as Pebax, having 132 barrer and $CO_2/N_2$ selectivities of about 6 to 25° C. and 3 atm, (iii) polymers based on polyamides (PVAm) with permeabilities of 41-104 GPU with $CO_2/N_2$ selectivity in the range 100-197 at 25° C. and 2 atm using wet mixtures of $CO_2$ and $N_2$ (GPU=$10^{-6}$ $cm^3$(STP)/($cm^2 \cdot s \cdot cmHg$)). Among others, Polaris™ and Polyactive products are commercial examples of this technology.

It should be observed that a high selectivity is needed to separate $CO_2$ from air, since the concentration of $CO_2$ in the air is about 0.035% and the concentration of $N_2$ is about 78%.

b. Technology of Separating $CO_2$ by Means of Inorganic Membranes

Considering membranes based on molten carbonates separately, the group of membranes based on inorganic materials for separating $CO_2$ from gas currents includes metallic membranes (based on Pd), membranes based on silicas, carbon membranes, and membranes based on zeolites.

Metallic membranes are based on palladium and its alloys. These materials present high $H_2$ permeabilities. Therefore, they are fundamentally used for separating $H_2$ in precombustion systems. Membranes of this type are a mature technology for systems for capturing $CO_2$ in precombustion. However, the stability of these materials must be improved to be implemented in industrial systems.

Porous inorganic membranes (membranes based on silica, zeolites, metal-organic frameworks (MOFs) and carbon membranes) can be applied for separating $CO_2$.

Zeolites are aluminosilicates characterized for a homogenous porous structure and a minimum channel diameter. The separation in these materials is produced by surface diffusion or by molecular sieving. Three separation regimes are distinguished: (i) when molecules have similar adsorption forces but a different size, where smaller sized molecules more readily penetrate; (ii) when molecules have different adsorption forces and similar sizes, where the membrane is selective for the molecule having higher adsorption forces; (iii) when molecules have different adsorption forces and sizes, where the mechanism is a combination between the competitivity between adsorption forces and diffusivity. $CO_2/N_2$ and/or $CO_2/CH_4$ selectivities can thereby be maximized at low temperatures by separating the gases through the third regime, or at high temperatures by means of the first regime. ZSM-5 with $CO_2/N_2$ selectivities of 9.5 to 303 K (from −263.65° C. to 29.85° C.) and a $CO_2$ permeability of $3 \cdot 10^{-7}$ mol/($m^2 \cdot s \cdot Pa$) and Y-type zeolites with $CO_2$ permeabilities of $4 \cdot 10^{-7}$ mol/($m^2 \cdot s \cdot Pa$) and selectivities of 100 and 21 for $CO_2/N_2$ and $CO_2/CH_4$, respectively, at 303 K (29.85° C.) should be emphasized among the zeolites.

Membranes based on silica have enormous potential for separating $CO_2/N_2$ and $H_2/CO_2$, due to their high chemical, thermal, and mechanical stability in different atmospheres and conditions. The behavior of membranes of this type is highly conditioned, among other factors, by the synthesis method thereof. Permeabilities are in the range of $3 \cdot 10^{-10}$-$5 \cdot 10^{-7}$ mol/($m^2 \cdot s \cdot Pa$), reaching selectivities of 60 for $CO_2/N_2$, 325 for $CO_2/CH_4$, and 670 for $CO_2/H_2$, depending on the type of silica, the synthesis method, and conditions.

Carbon membranes made up of amorphous microporous materials with a high carbon content have emerged as promising materials for gas separation applications due to their thermal resistance, chemical stability in corrosive environments, high gas permeability, and excellent selectivity compared to polymer membranes. Considering the separation of $CO_2$, these materials reach selectivities of 100 for $CO_2/CH_4$ with $CO_2$ permeabilities of 2000-10000 barrer, and selectivities of 10 for $CO_2/N_2$ with $CO_2$ permeabilities of 5 barrer.

c. Technology for Separating $CO_2$ by Means of Membranes Based on Molten Carbonates Using materials similar to ionic (oxygen)-electronic conducting ceramics, materials based on molten carbonates which allow the selective passage of $CO_2$ have been developed. However, membranes of this type are still far from industrial applications due to low $CO_2$ flows observed in the different papers published to date.

Reciprocating Internal Combustion Engines

The reciprocating internal combustion engines represent the most important technology for land and sea vehicles for both heavy-duty and passenger transport. Both their design and their auxiliary machinery (turbomachines; fuel injection systems; additional pumps and heat exchangers) have been profoundly optimized in the past century for several types of fuel. Four-stroke reciprocating engines lead in land transport because of their high specific power, their capacity to comply with the various regulations on pollutant gas and acoustic emissions and their low average specific consumption.

Nevertheless, the need to limit $CO_2$ emissions or even to remove atmospheric $CO_2$ and the need to improve air quality in overpopulated urban environments are putting pressure on the technological limits of these engines with the current concepts of combustion and renewal of the load thereof.

Oxy-Combustion in Engines

Integrating an oxy-combustion system in an engine for vehicles magnifies the advantages set forth (higher efficiencies and reduced emissions) but complicates the manner of producing oxygen since the space is limited to the dimensions of the vehicle. Considering engines that use oxygen as an oxidizing agent, several alternatives have been proposed:

(i) Storing oxygen in the vehicle. This system places the problem of generating oxygen outside of the vehicle, so only having space inside the vehicle for the oxygen storage system is required. Several studies have proposed storing oxygen in liquid form in the vehicle to reduce space (see documents CN201835947U and DE3625451A1, among others). However, this would increase the cost of the oxygen and of a storage system which would require low temperatures to keep the oxygen in liquid phase. Other studies have proposed the idea of storing compressed oxygen in tanks inside the vehicle (document U.S. Pat. No. 3,425,402). Despite all that, this type of solution would require generating the oxygen elsewhere, whereby in addition to the expense for the storage system (both for the liquid phase and for the gas phase), the operating expense for the oxygen would have to be considered. Considering all these extra costs, a priori this alternative would not be viable, and an improvement in the current technology with respect to oxygen generation and storage would be needed.

(ii) Generating the oxygen from alternative sources relative to air. Document U.S. Pat. No. 3,709,203 describes generating oxygen from a thermal decomposition of an alkaline metal perchlorate; according to document U.S. Pat. No. 3,961,609A, the oxygen is generated by means of water electrolysis; and according to document U.S. Pat. No. 2,775,961A it is generated from hydrogen peroxide. However, due to the high oxygen demands needed by these systems, it seems unlikely that integrating any of these solutions in an engine for a vehicle is viable and competitive with respect to the current technology.

(iii) Generating oxygen from air:
    a. Introducing filtering systems (document U.S. Pat. No. 3,961,609A) or PSA adsorption (document WO 2005083243). This type of solution has the drawback that very large systems would be required to meet the oxygen demand.

b. Using membranes based on silicones or polysulfones (documents US20030024513A1, U.S. Pat. Nos. 5,636,619A, 5,678,526, 5,636,619, US2006/0042466A1, CN101526035A). However, systems of this type have been proposed more for enriching oxygen in the air than for generating pure oxygen, such that the membrane areas needed to achieve a degree of purity acceptable for the process would render the process unfeasible.

c. Using membranes based on ceramic conductors. (c1) Using an electrochemical cell by means of a ceramic oxygen ion conducting electrolyte (document US 20090139497A1); nevertheless, this system would need a demand for electrical energy which must necessarily be taken out of the engine, thereby decreasing system efficiency. (c2) Using mixed oxygen ionic-electronic conducting membranes (document US20130247886A1) where the oxygen is selectively separated from the air current. This process requires large amounts of heat to keep the temperature around 700-1000° C. To that end, this system uses heat from the engine outlet gases.

SUMMARY OF THE INVENTION

The objective of the present invention is to provide an internal combustion engine which offers advantages with respect to the state of the art described above. More particularly, the present invention discloses an internal combustion engine as defined in attached claim 1, reducing pollution as it reduces, or even prevents, NOx emission into the atmosphere.

The dependent claims disclose additional embodiments of the engine of the present invention offering additional advantages with respect to the prior art.

More specifically, in its broadest aspect, the present invention discloses an internal combustion engine of the type that suctions atmospheric air as an oxidizing agent and uses hydrocarbons as a fuel, comprising:
  a first regenerative Brayton cycle of air compressions with intermediate cooling and nitrogen expansions with reheating by mixing a part of the nitrogen, comprising a MIEC membrane that separates the $O_2$ from the compressed air, such that the suctioned air current is free from $N_2$, and a depleted air from the rejection from the MIEC membrane is sent directly to an exhaust gas current, preventing its participation in a subsequent combustion, in which part of the air compressions are performed in at least one first cylinder of the engine;
  a second Brayton cycle with compression with intermediate cooling, combined in a binary manner with the first Brayton cycle (transferring heat to same) and nested with a cycle selected from an Otto cycle and a diesel cycle performed by means of oxy-combustion in at least one second cylinder of the engine,
  wherein the second Brayton cycle transmits mechanical energy, by means of the coupling of the at least one first cylinder with the at least one second cylinder through a crankshaft, and thermal energy from exhaust gases to the first Brayton cycle;
  wherein the first Brayton cycle provides compressed $O_2$ from the MIEC membrane to the second Brayton cycle;
  whereby the NOx emission into the atmosphere is prevented by the separation of $N_2$ in the MIEC membrane.

As one skilled in the art will readily understand, when it is mentioned herein that an engine "comprises a first Brayton cycle", and similar expressions, it must be interpreted to mean that the engine "comprises the means necessary for carrying out a first Brayton cycle". In such cases, the present invention is not intended to be limited to any specific combination of means, and it must be understood that any means suitable for carrying out said Brayton cycle (or the like) is covered by the present invention.

According to another aspect, the present invention also discloses an operating method of an internal combustion engine of the type that suctions atmospheric air as an oxidizing agent and uses hydrocarbons as a fuel, the method comprising:
  a first regenerative Brayton cycle of air compressions with intermediate cooling and nitrogen expansions with reheating by mixing a part of the nitrogen, which comprises separating the $O_2$ from the compressed air, such that the suctioned air current is free from $N_2$, and a depleted air from the rejection of the separation is sent directly to an exhaust gas current, preventing its participation in a subsequent combustion;
  a second Brayton cycle with compression with intermediate cooling, combined in a binary manner with the first Brayton cycle (transferring heat to same) and nested with a cycle selected from an Otto cycle and a diesel cycle performed by means of oxy-combustion,
  wherein the second Brayton cycle transmits mechanical energy and thermal energy from exhaust gases to the first Brayton cycle;
  wherein the first Brayton cycle provides compressed $O_2$ from the separation to the second Brayton cycle;
  whereby the NOx emission into the atmosphere is prevented by the separation of $N_2$.

As will be described in a more detailed manner hereinbelow, the present invention integrates membranes based on mixed oxygen ionic-electronic conducting ceramic materials such that all the energy necessary for the MIEC membrane for separating $O_2$ from the main source of residual heat (such as exhaust gases at the outlet of the cylinders) is recovered, and the increases in temperature offered by oxy-combustion are utilized to supply the necessary temperature to the membrane without heat waste. The present invention also intends to utilize the high compression capacity of cylinders in reciprocating engines (to 25 MPa) to achieve suitable pressure conditions. High pressures are needed for the following processes, which are provided in at least some of the preferred embodiments according to the present invention: maximizing the difference in partial pressure between air and $O_2$ in order to maximize the $O_2$ productivity of the membrane; maximizing the separation of atmospheric $CO_2$ from the air; and lastly, compressing $CO_2$ until liquefying it (exceeding its critical pressure of 7.5 MPa).

Turbomachines in engine supercharging systems are not used in the present invention for the process of compressing air before the separation thereof or for $CO_2$ densification (unlike document US20130247886A1) due to the low compression ratios they provide (maximum pressure of less than 0.6 MPa at sea level). There are no developments for turbochargers in turbo assemblies for pressures greater than 0.6 MPa, and they are very inefficient around those values.

Nor is the temperature associated with air compression in turbochargers utilized (also unlike document US20130247886A1) due to the much lower efficiency of isentropic and irreversible compression processes compared to isothermal compression processes. However, in the present invention the compressed air is always cooled before passing to the following compression step for the process to be the most isothermal (and therefore the most efficient) possible. This is done either with heat exchangers that use water to cool the air charge (commonly WCAC), or else with vacuum Brayton cycles converting heat into pressure (VBC). Both VBCs and WCACs remove heat from the fluid and transmit it to the environment before the following compression, which, though seemingly an energy expenditure, is actually a gain that is capitalized on in said following compression step. It even seeks to obtain the highest mechanically possible compression ratio in four-stroke engine cylinders, given that since the air compression process is carried out in four strokes, the air stays in the cylinders for a long time, said residence time contributing to the cooling thereof against the coolant of the engine. This cooling of the air a high pressure causes the process to be closer to isothermal and, again, more efficient. This innovative use of the four strokes of the engine, without there being any combustion in those cylinders, is described for the first time in this document.

The final reason to seek maximum energy efficiency in all the processes is to achieve an oxy-combustion engine/drive assembly presenting at least one of the following characteristics: it does not emit or emits negligible amounts of polluting gases; it traps the $CO_2$ produced in combustion and removes from the environment all or part of the atmospheric $CO_2$; it is compact and lightweight so that it can be self-transported; and lastly, it is competitive with current internal combustion engines in terms of fuel consumption.

To achieve this latter objective, the present invention describes in one of its preferred embodiments a completely novel system for regulating the engine charge. This system avoids the flow throttling butterfly valve for regulating the engine charge in spark ignition (SI) engines with homogeneously mixed oxy-combustion. This is done by using turbo assemblies not for supercharging combustion cylinders (as proposed in document US20130247886A1), but rather for supercharging the cylinders compressing the air before the membranes, and it uses the regulation of the $O_2$ production from the MIEC to regulate the charge. Avoiding the use of the throttle eliminates pumping losses in SI engines with premixed combustion during the regulation of its charge, which is the primary inefficiency in these engines. The second inefficiency that oxy-combustion avoids in SI engines with premixed combustion is the enrichment of the mixture (surpassing the stoichiometric air/fuel ratio: $\lambda<1$) to control exhaust gas temperature. This temperature control is performed in the present invention by diluting the $O_2$-fuel mixture with the pure $CO_2$ used to sweep the $O_2$ side in the MIEC instead of using fuel. The proposed arrangement of the turbo assemblies and of the MIEC allows independently carrying out both control of the $O_2$ production rate and control of the rate of dilution thereof with $CO_2$. This arrangement of turbomachines and membrane allows performing both controls more efficiently than what has been described up until now in the state of the art, as control of the pressure is performed by expanding flow in the turbines instead of the inefficient lamination of pressure in regulation valves (this is what has been proposed in document US20130247886A1 for example).

Furthermore, in one of its preferred embodiments the present invention proposes using liquid $CO_2$ during the combustion cycle of the reciprocating engine. This allow recovering a large part of the energy needed to liquefy $CO_2$ in a supercritical engine cycle with this fluid which works in a simultaneous and conjugate manner with the $O_2$ cycle. Both cycles share some of their processes, fundamentally the process of increasing the thermal state and the process of expanding the fluid. Neither the supercritical $CO_2$ cycle explained in this case nor the conjugate $O_2$ cycle with which it shares some of its processes have been described by sources prior to the present invention.

During $CO_2$ liquefaction, in order to subsequently store and transfer same to the relevant processing centers, there is produced a certain percentage (around 2% of the total mass of transferred substance) of liquid water that must be separated from the $CO_2$. A further difference between the present invention and document US20130247886A1 is that the energy from the water separated under high pressure is harnessed and expanded in a vapor state in one of the turbines. This use has the virtue on one hand of giving off water in the form of vapor rather than a gushing of liquid and, on the other hand, of reducing energy consumption to achieve the necessary air pressure in the membranes for separating $O_2$.

BRIEF DESCRIPTION OF THE DRAWINGS

The present invention will be better understood in reference to the following drawings illustrating preferred embodiments thereof provided by way of example and not to be interpreted as limiting of the invention in any way.

DETAILED DESCRIPTION OF THE PREFERRED EMBODIMENTS

Figure 1:
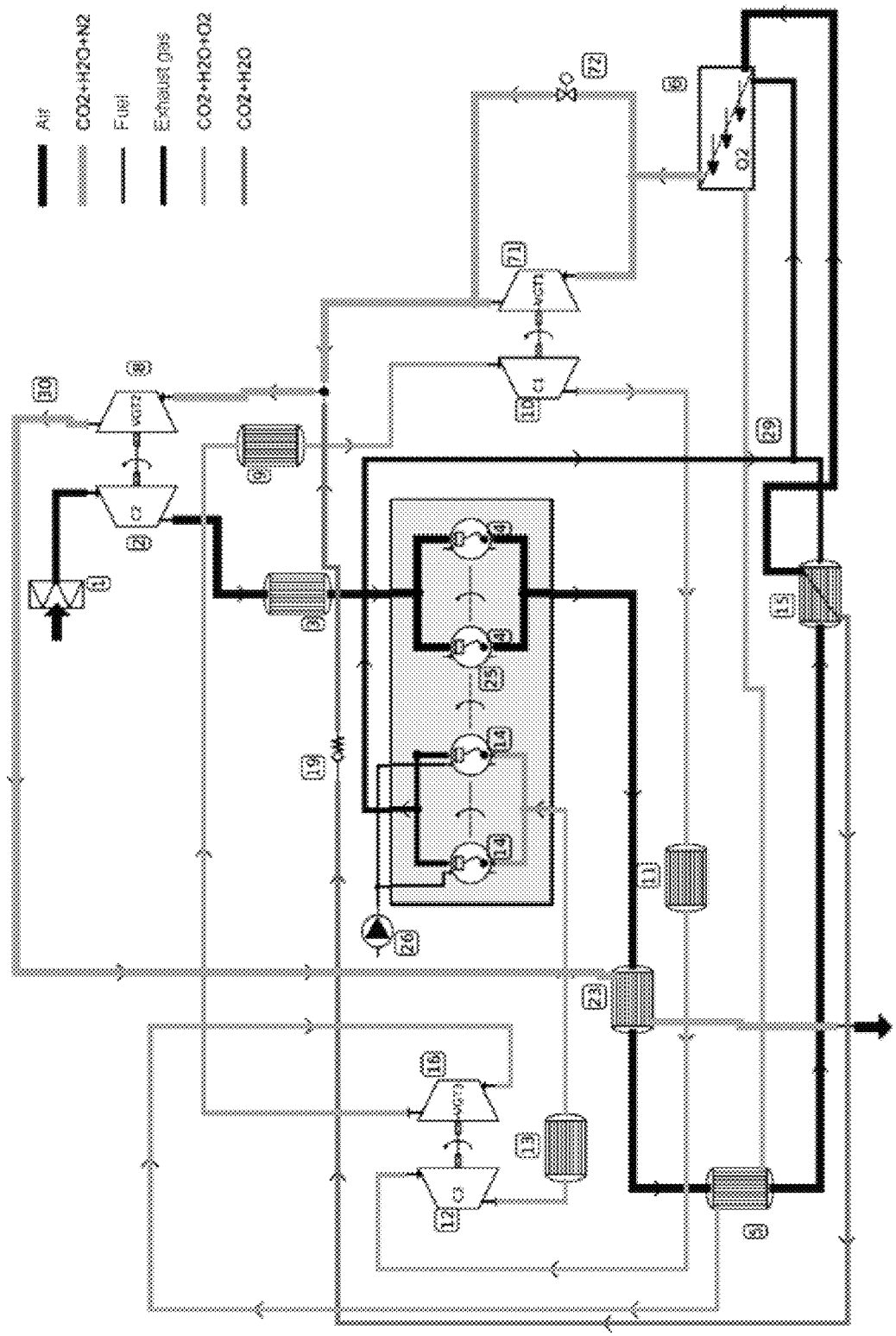
FIG. 1 shows a diagram of a premixed oxy-combustion engine according to a first preferred embodiment of the present invention, with a homogeneous and stoichiometric mixture, high specific power, high efficiency, with a MIEC to separate the $O_2$ from the air, without the emission of gases that are harmful to health but with positive net $CO_2$ emissions.

As mentioned above, the present invention discloses an internal combustion engine of the type that suctions atmospheric air as an oxidizing agent and uses hydrocarbons as a fuel, comprising:
  a first regenerative Brayton cycle of air compressions with intermediate cooling and nitrogen expansions with reheating by mixing a part of the nitrogen, comprising a MIEC membrane (6) that separates the $O_2$ from the compressed air, such that the suctioned air current is free from $N_2$, and a depleted air from the rejection from the MIEC membrane (6) is sent directly to an exhaust gas current, preventing its participation in a subsequent combustion, in which part of the air compressions are performed in at least one first cylinder (4), preferably two first cylinders (4), of the engine;
  a second Brayton cycle with compression with intermediate cooling, combined in a binary manner with the first Brayton cycle and nested with a cycle selected from an Otto cycle and a diesel cycle performed by means of oxy-combustion in at least one second cylinder (14), preferably two second cylinders (14) of the engine,
wherein the second Brayton cycle transmits mechanical energy, by means of the coupling of the at least one first cylinder (4) with the at least one second cylinder (14) through a crankshaft (25), and thermal energy from exhaust gases to the first Brayton cycle;
  wherein the first Brayton cycle provides compressed $O_2$ from the MIEC membrane (6) to the second Brayton cycle; whereby the NOx emission into the atmosphere is prevented by the separation of $N_2$ in the MIEC membrane (6).

According to a preferred embodiment, the net mechanical energy produced by the first Brayton cycle is used to supercharge the second Brayton cycle through a compressor C1 (10).

According to another preferred embodiment, the MIEC membrane (6) produces pure $O_2$ separated from atmospheric air. The term "pure" (for example, applied to a gas current, such as "pure $O_2$") must not be interpreted in a strict, limiting sense in the present specification. For example, in this case, the produced $O_2$ current may not be 100% pure, but rather also may also contain some minor amount of, for example, $CO_2$. However, this pure $O_2$ (or substantially pure $O_2$) current has been separated from $N_2$, such that the production of NOx in a subsequent oxy-combustion, and therefore the emission of said NOx into the atmosphere, is prevented.

According to another preferred embodiment, the MIEC membrane (6) produces $O_2$ diluted with $CO_2$. The $CO_2$ with which the $O_2$ is diluted in this case can either be obtained from atmospheric air, or else it can be produced by combustion with hydrocarbon in the second Brayton cycle.

According to another preferred embodiment, there is always a cooling step after each compression step.

According to another preferred embodiment, heat is recovered from all the residual sources by means of combining the first and second Brayton cycles performing regenerations before each cooling.

According to another preferred embodiment, the mechanical energy produced by the second Brayton cycle is furthermore used to compress the $CO_2$ produced until liquefying it. Said $CO_2$ can be compressed, for example, to at least 7.5 MPa. Furthermore, the second Brayton cycle can be nested with an Otto cycle, and the engine comprises at least one additional piston (22) as well as check valves (a first check valve (33) at the inlet and a second check valve (19) downstream of same) to suction and compress excess $CO_2$ accumulated in conduits of the engine.

According to another alternative of this last preferred embodiment, the second Brayton cycle is nested with a diesel cycle, and the exhaust stroke of the second cylinders (14) is used to compress the $CO_2$, by means of the use of first and second check valves (33, 19) which allow the discharge of $CO_2$ and the intake of substantially pure $O_2$. This substantially pure $O_2$ is used as an entrainment gas in $CO_2$ selective separation membranes.

According to another preferred embodiment, the engine further comprises a vacuum Brayton cycle (VBC) to more intensely cool the substantially pure $O_2$, or the $O_2$ diluted with $CO_2$, before a subsequent compression.

According to another preferred embodiment, the engine comprises a first tank (20) for storing the liquefied $CO_2$ produced. Said $CO_2$ stored in the first tank (20) can be used to pump fuel from a second tank (27) to the second cylinders (14) of the engine, with both first and second tanks (20, 27) being in one and the same tank separated by a flexible membrane (replacing the low pressure pump used in common rail-type injection systems, which are the most widespread type of compression ignition engines today) and/or can be transferred to a pump of an external $CO_2$ logistics network.

According to another preferred embodiment, the MIEC membrane (6) is based on crystalline ceramic materials having mixed oxygen ionic-electronic carrier conduction.

According to another preferred embodiment in which the engine is a spark ignition (SI) engine, turbo assemblies are used to supercharge the first cylinders (4) and the regulation of the $O_2$ production of the MIEC membrane (6) is used to regulate the engine charge.

According to another preferred embodiment in which the engine is a compression ignition (CI) engine, turbo assemblies are used to supercharge the first cylinders (4) and the regulation of the $O_2$ production of the MIEC membrane (6) is used to regulate the effective compression ratio of the working fluid in the cycle of the engine.

In another aspect, the present invention discloses an operating method for an internal combustion engine of the type that suctions atmospheric air as an oxidizing agent and uses hydrocarbons as a fuel, the method comprising:

a first regenerative Brayton cycle of air compressions with intermediate cooling and nitrogen expansions with reheating by mixing a part of the nitrogen, which comprises separating the $O_2$ from the compressed air, such that the suctioned air current is free from $N_2$, and a depleted air from the rejection of the separation is sent directly to an exhaust gas current, preventing its participation in a subsequent combustion;

a second Brayton cycle with compression with intermediate cooling, combined in a binary manner with the first Brayton cycle and nested with a cycle selected from an Otto cycle and a diesel cycle performed by means of oxy-combustion, wherein the second Brayton cycle transmits mechanical energy and thermal energy from exhaust gases to the first Brayton cycle;

wherein the first Brayton cycle provides compressed $O_2$ from the separation to the second Brayton cycle;

whereby the NOx emission into the atmosphere is prevented by the separation of $N_2$.

According to a preferred embodiment of the method, the net mechanical energy produced by the first Brayton cycle is used to supercharge the second Brayton cycle.

According to a preferred embodiment of the method, the first Brayton cycle produces pure $O_2$ separated from atmospheric air. Alternatively, the first Brayton cycle produces $O_2$ diluted with $CO_2$. In this case, the $CO_2$ with which the $O_2$ is diluted can be obtained from atmospheric air or can be produced by combustion with a hydrocarbon in the second Brayton ycle.

According to a preferred embodiment of the method, there is always a cooling step after each compression step.

According to a preferred embodiment of the method, heat is recovered from all the residual sources by means of combining the first and second Brayton cycles performing regenerations before each cooling.

According to a preferred embodiment of the method, the mechanical energy produced by the second Brayton cycle is furthermore used to compress the $CO_2$ produced until liquefying it. For example, the $CO_2$ can be compressed to at least 7.5 MPa. Furthermore, the second Brayton cycle can be nested with an Otto cycle, and the method comprises suctioning and compressing excess $CO_2$ accumulated in conduits of the engine.

According to another alternative, the second Brayton cycle is nested with a diesel cycle, and the method comprises compressing $CO_2$, allowing the discharge of $CO_2$ and the intake of substantially pure $O_2$, with the latter being used as an entrainment gas in $CO_2$ selective separation membranes.

According to a preferred embodiment, the method further comprises a vacuum Brayton cycle (VBC) to more intensely cool the substantially pure $O_2$, or the $O_2$ diluted with $CO_2$, before a subsequent compression.

According to a preferred embodiment, the method comprises storing liquefied $CO_2$ produced. Said liquefied $CO_2$ can be used to pump fuel to the cylinders of the engine and/or can be transferred to a pump of an external $CO_2$ logistics network.

A detailed description of preferred embodiments of the present invention is provided below in reference to the attached figures in order to further illustrate and not limit the teachings disclosed by the present invention.

Embodiment 1: Spark Ignition (SI) Engine with a Premixed Mixture, Without Polluting Gas Emissions, and Without the Capture of $CO_2$ Embodiment 1 is indicated for spark ignition (SI) engines with a premixed (homogeneous) mixture without the capture of $CO_2$. Embodiment 1 is based on a process of deflagration combustion, with subsonic speed and without self-ignition of the mixture, for the production of net mechanical power.

The degree of charge (percentage of the maximum torque) of the engine is controlled by the $O_2$ production rate in the MIEC membrane (6). This reduces pumping losses as it eliminates the use of throttling butterfly valves to throttle airflow.

The combustion temperature is controlled by dilution of the mixture of oxidizing agent ($O_2$) and fuel ($H_xC_yO_z$) with $CO_2$ and $H_2O$ from the actual combustion and pre-cooling. This prevents using fuel for this task (standard practice in SI engines today).

Embodiment 1 does not propose capturing the $CO_2$ emitted by the engine. However, it does provide an improved energy efficiency with respect to the current SI engines and eliminates polluting gas (CO, THCs, PM, and NOx) emissions at the source (combustion chamber) and in the MIEC membrane (6), minimizing the need for post-treatment to clean the exhaust gases, which represents considerable savings in the production cost of the engine. At present, post-treatment for cleaning gases is estimated to be in the order of 30% of the total cost of the power assembly. Furthermore, oxy-combustion assures that polluting gas emissions are minimized during the cold starting process. This does not occur in engines today given the time needed to heat up (activate) the large post-treatment systems needed for cleaning exhaust gases.

Embodiment 1 is depicted in FIG. 1. In embodiment 1, atmospheric air enters the engine through a filter (1) suctioned by a compressor (C2) (2). Compressor C2 (2) is part of a turbo assembly and is mechanically coupled to a variable geometry turbine (VGT2) (8). Compressor C2 (2) transfers air using the energy recovered by turbine VGT2 (8) from the $N_2$, $CO_2$, and $H_2O$ rejected in the MIEC membrane (6), and the $CO_2$ and $H_2O$ not recirculated to the second cylinders (14) of the engine, which circulate through the conduit that comes out of a catalytic MIEC membrane (15) and converges with the conduit coming from the rejection of the MIEC membrane (6). Under rated conditions, the air at the outlet of compressor C2 (2) has a pressure and a temperature of about 0.4 MPa and 473 K (199.85° C.). The air passes through a first water-cooler of air charge (WCAC) (3) of the engine. At the outlet of the first WCAC cooler (3), the temperature drops to about 323 K (49.85° C.), which makes the subsequent compression in the first cylinders (4) of the engine more isothermal.

The air is subsequently suctioned by half of the first cylinders (4) of the engine. Embodiment 1 depicts a 4-cylinder, 4-stroke engine, so there are 2 cylinders that suction the air. The first cylinders (4) act like pumps compressing the air to about 0.9 MPa and 473 K (199.85° C.). The first cylinders (4) are preferably identical to the remaining cylinders of the engine, sharing the crankshaft (25), the camshaft, and the valve timing gear, and having as a unique singularity that fuel is not injected therein. Since it is a 4-stroke engine, the air remains inside the first cylinders (4) for 4 strokes, so it is compressed and cooled with the engine cooling water (at about 363 K (89.85° C.)), which contributes to making the compression more isothermal. These first cylinders (4) work as a starting system for the turbomachine assembly to start up the cycle airflow and turbines. They are moved to that end until the startup of the system by a conventional starting motor of the type used in reciprocating engines.

At the outlet of the first cylinders (4), the air is heated in a first regenerative heat exchanger (23) which lowers its pressure to about 0.87 MPa and raises its temperature to about 573 K (299.85° C.), using to that end the thermal energy from a flow of $CO_2$, $H_2O$, and $N_2$. This flow of $N_2$, $CO_2$, and $H_2O$ comes out through the conduit (30) located downstream of turbine VGT2 (8). This flow of $N_2$, $CO_2$, and $H_2O$ represents about 100% of the total flow volume of gases transferred by the engine and is at an approximate temperature of 800 K (526.85° C.) and a pressure of 0.1 MPa. At the outlet of the first regenerative heat exchanger (23), the air is heated in a second regenerative heat exchanger (5) which lowers its pressure to about 0.85 MPa and raises its temperature to about 673 K (399.85° C.), using to that end the thermal energy from the $O_2$ produced by the MIEC membrane (6) and from the exhaust gases used to entrain the $O_2$ exchanged in the MIEC membrane (6) and to lower the partial pressure of $O_2$ in the entrainment chamber.

At the outlet of the second regenerative heat exchanger (5), the air is heated again in a catalytic MIEC membrane (15) (this membrane has a catalyst favoring the complete oxidation of CO and HC to $CO_2$ and $H_2$ with the $O_2$ from the environment) which lowers its pressure to about 0.8 MPa and raises its temperature to about 723 K (449.85° C.), using to that end the thermal energy from exhaust gases from the combustion of the second cylinders (14). In the catalytic MIEC membrane (15), the exhaust gases transfer their heat to the air (acting like a regenerative heat exchanger) and both CO and HC oxidize until the entire gas flow is made up of only $CO_2$ and $H_2O$. The need for post-treatment to clean gases from this engine is thereby reduced by 20%, since this exhaust gas flow represents about 20% of the total flow volume of exhaust gases transferred by the engine. After the catalytic MIEC membrane (15), the air at a pressure of 0.8 MPa enters the MIEC membrane (6) where it reaches the working temperature of the MIEC membrane (6) (about 1173 K (899.85° C.)) as a result of the heat exchange with the exhaust gases coming from the oxy-combustion process of the second cylinders (14) and used to sweep the $O_2$ exchanged in the MIEC membrane (6). This exhaust gas flow coming from the oxy-combustion process of the second cylinders (14) represents about 80% of the flow volume of exhaust gases.

The rejection from the MIEC membrane (6) is fundamentally $N_2$ at 0.8 MPa and 1173 K (899.85° C.); it represents about 80% of the mass of gas transferred by the system and passes through a turbine VGT1 (71) or through a control valve (72). Turbine VGT1 (71) and the control valve (72) are part of a turbo assembly together with compressor C1 (10), to which turbine VGT1 (71) is mechanically linked. Turbine VGT1 (71) harnesses the energy from the flow of $N_2$ rejected from the MIEC membrane (6), recovering its energy to move compressor C1 (10). The control valve (72) regulates the flow of energy to compressor C1 (10). Compressor C1 (10) transfers a mixture of $CO_2$, $H_2O$, and $O_2$ coming from the outlet of the entrainment from the MIEC membrane (6). Compressor C1 (10) transfers about 95% of the gas flow from the engine. As a consequence, the control valve (72) regulates the flow of $CO_2$ and $H_2O$ used to dilute the $O_2$ and, hence, the combustion temperature and the exhaust gas combustion temperature. In conclusion, the temperature of the exhaust gases of the engine at the outlet of the second cylinders (14) is regulated by the control valve (72), and it is regulated at an approximate value of 1273 K (999.85° C.) under rated conditions.

The control valve (72) usually works being partially open so as to regulate the pressure of compressor C1 (10). A part of the $N_2$ rejected in the MIEC membrane (6) circulates through turbine VGT1 (71), being expanded and cooled. The other part of the rejected $N_2$ circulates through the actual control valve (72), without being cooled down. This other part of the $N_2$ is mixed downstream of turbine VGT1 (71) with the cold and expanded $N_2$, reheating it, and accordingly increasing its temperature.

After passing through the control valve (72) and/or through the turbine (71), the $N_2$ rejection from the MIEC membrane (6) (about 80% of the airflow) is mixed with the $CO_2$ and $H_2O$ coming from the second check valve (19), and both flows are harnessed in variable geometry turbine VGT2 (8), which is used to move compressor C2 (2). The approximate rated inlet conditions relative to turbine VGT2 (8) are 0.3 MPa and 873 K (599.85° C.). The variable geometry of turbine VGT2 (8) is used to regulate the degree of charge of the combustion engine. When turbine VGT2 (8) is closed, it increases the airflow through the MIEC membrane (6) and the working pressure in the MIEC membrane (6). Therefore, it increases the hourly production of $O_2$ and the amount of fuel that can be injected under stoichiometric conditions. The inverse happens when turbine VGT2 (8) is opened. The minimum size (minimum opening) of turbine VGT2 (8) is chosen in accordance with the cylinder capacity of the reciprocating engine to set the maximum power of the system at each rotating speed of the engine. The maximum opening of turbine VGT2 (8) determines the minimum charge (idle) of the reciprocating engine at each rotating speed. Turbine VGT2 (8) can also comprise a wastegate (or WG) valve. When turbine VGT2 (8) or its wastegate valve are opened to the maximum, the energy of compressor C2 (2) is reduced to zero, whereby both the working pressure of the MIEC membrane and the flow volume of transferred air are reduced.

If the engine charge is to be reduced even more, until lowering it to zero, then the control valve (72) is opened, avoiding turbine VGT1 (71), so the energy of compressor C1 (10) is reduced to zero. In this case the exhaust gas flow (in which the $CO_2$ can be found) to the MIEC membrane (6) is detained. This equals out the partial pressure of $O_2$ on both sides of the MIEC membrane (6) and detains the flow of $O_2$ production, leaving the engine charge of this embodiment 1 idle.

At the outlet of turbine VGT2 (8), the mixture of $N_2$, $CO_2$, and $H_2O$ at a pressure of about 0.1 MPa and temperature of about 800 K (526.85° C.) is passed through the first regenerative heat exchanger (23) to transfer its heat to the air before discharging this mixture of gases (free from gases that are harmful to health) into the atmosphere.

The mixture of $O_2$, exchanged by the MIEC membrane (6), and of $CO_2$ and $H_2O$, used to sweep and lower the partial pressure of $O_2$, exit at the corresponding end of the MIEC membrane (6), to the second combustion cylinders (14), suctioned by compressor C1 (10). This mixture exits at a rated pressure and temperature of about 0.3 MPa and 1173 K (899.85° C.), respectively, and represents about 105% of the flow volume of air transferred by the engine. The heat of the mixture of $CO_2$, $H_2O$, and $O_2$ is recovered first in the second regenerative heat exchanger (5) to heat the air at the outlet of the first regenerative heat exchanger (23). At the outlet of the second regenerative heat exchanger (5), there are rated conditions of about 0.25 MPa and 673 K (399.85° C.). This current is harnessed in a variable geometry turbine (VGT3) (16) at the outlet of the second regenerative heat exchanger (5) used to move a compressor (C3) (12) mechanically coupled in another turbo assembly. Compressor C3 (12) is used to supercharge the second cylinders (14), such as turbosuperchargers in use, using the energy recovered by turbine VGT3 (16). Turbine VGT3 (16) is closed to keep the pressure at the outlet of compressor C3 (12) constant at a rated value of 0.6 MPa under any operating condition of the engine. At the outlet of turbine VGT3 (16), the rated conditions of the flow are about 0.1 MPa and 473 K (199.85° C.). The oxidizing mixture continuing to the second cylinders (14) is cooled in a second WCAC cooler (9) to 323 K (49.85° C.). Next, it is compressed in compressor C1 (10) to 0.3 MPa and 473 K (199.85° C.), with the conditions of compressor C1 (10) being those imposed by the control valve (72) to keep the temperature of the exhaust gases around 1273 K (999.85° C.), as has already been described. After compressor C1 (10), the mixture of $CO_2$, $H_2O$, and $O_2$ is cooled again to 323 K (49.85° C.) in a third WCAC cooler (11) and is compressed in compressor C3 (12) to 0.6 MPa and 473 K (199.85° C.). To that end, the energy of turbine VGT3 (16) which regulates the pressure at the outlet of compressor C3 (12) equal to 0.6 MPa, as has already been described, is used. Lastly, the mixture is cooled again in a fourth WCAC cooler (13) to 323 K (49.85° C.) before being suctioned by the second cylinders (14), with there being 2 in this embodiment as it is half of those of a 4-cylinder, 4-stroke engine which has been used as an example, as established at the beginning of the description of the present embodiment.

In the second cylinders (14), a hydrocarbon $H_xC_yO_z$ is injected with a fuel pump (26) into the mixture of $CO_2$, $H_2O$, and $O_2$ in a proportion that is stoichiometric with $O_2$. In said second cylinders (14), a spark ignition premixed combustion cycle, and a cycle similar to the Otto cycle is performed. The second cylinders (14) produce energy to move the first cylinders (4) that transfer air for the MIEC membrane (6) as they are coupled on the same crankshaft (25). The second cylinders (14) produce a surplus of net mechanical energy used to move the vehicle to which the engine is coupled, or the electric generator or any application requiring an input of mechanical energy through a shaft. These second cylinders (14) also work as a starting system for the turbomachine assembly to start up the airflow, the flow of $O_2$, and the turbomachines of the cycle. They are moved to that end until the startup of the system by a conventional starting motor of the type used in reciprocating engines. Therefore, both the first cylinders (4) and the second cylinders (14) work as a starting system and are moved until the startup of the system by a conventional starting motor.

The transfers of heat to the water in the first WCAC cooler (3), second WCAC cooler (9), third WCAC cooler (11), and fourth WCAC cooler (13) plus the heat transferred in the regenerations (produced in the first regenerative heat exchanger (23), second regenerative heat exchanger (5), and in the catalytic MIEC (15)) together with the discharge into the atmosphere of surplus exhaust gases (i.e., non-recirculated exhaust gases), through the branch-off (29) and the second check valve (19), represent the complete transfer of heat to the cold source necessary for the proposed thermodynamic cycle to comply with the second law of thermodynamics and to therefore be viable. In turn, transfers of heat in the first WCAC cooler (3), second WCAC cooler (9), third WCAC cooler (11), and fourth WCAC cooler (13) and in the regenerations (produced in the first regenerative heat exchanger (23), second regenerative heat exchanger (5), and in the catalytic MIEC (15)) contribute to minimizing the destruction of exergy of the thermodynamic cycle due, on one hand, to making the overall compression process of the working fluid more isothermal and, on the other hand, to recovering the energy from exhaust gases for the separation from the air. The approximation to isothermal compression and the use of regenerative heat exchangers for extracting heat from system gases approximate the $N_2$ cycle, separated from the air in the MIEC membrane (6), to a cycle with a yield equal to the Carnot cycle known as the Ericsson cycle. The cycle of the mixture of $CO_2+H_2O+O_2$ can be assimilated to a closed Brayton cycle with intermediate compressions and expansions but nested with an Otto cycle in the second cylinders (14), which has not been described up until now in the literature. Essentially, the quasi-closed Brayton cycle nested with the Otto cycle and binary relative to the $N_2$ cycle (by sending heat to the $N_2$ cycle, it complies with the thermodynamic principles for approximating an ideal cycle of maximum efficiency, such as the Ericsson cycle) is a novel embodiment of a binary cycle, complying with the principles of the other ideal cycle of maximum efficiency, the Carnot cycle.

Lastly, as a result of the combustion of the hydrocarbon (fuel) with the oxidizing mixture ($CO_2$, $H_2O$, $O_2$), a mixture of $CO_2$, $H_2O$, and, to a lesser extent, unburned THCs, and CO is produced at the outlet of the second cylinders (14).

The non-recirculated part of exhaust gases is diverted through the branch-off (29) to be discharged at the inlet of turbine VGT2 (8). This surplus represents about 20% of the exhaust gases, which are a mixture of $CO_2$, $H_2O$, CO, and unburned total hydrocarbons (THCs). Downstream of the branch-off (29) and upstream of the second check valve (19) is the catalytic MIEC membrane (15) where the exhaust gases enter at an approximate temperature of 1273 K (999.85° C.) and transfer their heat to 100% of the airflow transferred by the engine, whereby its temperature drops considerably to about 623 K (349.85° C.). At the same time, and due to the chemical reactions that are produced in the catalytic MIEC membrane (15), the CO and THCs are oxidized with the $O_2$ left over from combustion until forming $CO_2$ and $H_2O$ vapor. Again, because the oxy-combustion prevents the production of NOx in the second cylinders (14), the mixture of $H_2O$ and $CO_2$ formed in the catalytic membrane (15) is free from harmful gases (without CO, without THCs, and without NOx). Therefore, the mixture is discharged without any gas that is harmful to health.

Downstream of the catalytic MIEC membrane (15), the mixture of $CO_2$ and $H_2O$ is discharged through a second check valve (19) at the inlet of turbine VGT2 (8). The second check valve (19) is tared at an approximate pressure of 0.11 MPa and serves to prevent air or $N_2$ being able to enter the mixture of oxidizing gases during transient processes. Upstream of the second check valve (19), therefore, there is formed a volume that is closed and separated from the atmosphere. This volume is formed by a circuit of conduits free from $N_2$ acting as a system for accumulating the oxidizing mixture of $CO_2+H_2O+O_2$ after the engine is stopped. This accumulated mixture facilitates later startup of the engine, as there is already a surplus of $O_2$ produced by the MIEC membrane (6), which can be used to start up combustion in the second cylinders (14). Lastly, the mixture of $N_2$, $CO_2$, and $H_2O$ is discharged into the atmosphere through the conduit (30), previously passing through the first regenerative heat exchanger (23) to extract the heat thereof, as has already been described.

The remaining non-surplus exhaust gases (i.e., recirculated exhaust gases) represent about 80% of the flow volume thereof. This non-surplus mixture is suctioned by compressor C1 (10), compressor C3 (12) and the actual second cylinders (14) in order to pass through the MIEC membrane (6). In the MIEC membrane (6), recirculated exhaust gases perform, on one hand, the indirect function of sweeping and lowering the partial pressure of $O_2$ going through the membrane to improve the productivity of the MIEC membrane (6), and performs, on the other hand, the direct function of reducing the proportion of $O_2$ in the oxidizing mixture. The temperature of the combustion gases, around 1273 K (999.85° C.), at the outlet of the second cylinders (14) is thereby controlled. The cycle is thereby closed at the outlet of the MIEC membrane (6), and the mixture returns to the inlet of the second regenerative heat exchanger (5) to transmit its heat to the air.

In the described process, the engine works in an efficient manner both to keep the air/fuel ratio close to the stoichiometric ratio at all times and to regulate its charge without throttling the flow, but rather modulating the air transferred by compressor C2 (2) and the productivity of the membrane. The productivity of $O_2$ instantaneously responds to engine accelerations since the first cylinders (4) are mechanically coupled on the same shaft with the second cylinders (14). Therefore, the dynamic response of the engine does not experience the turbocharger lag that is typical of turbosupercharged engines. Lastly, the engine only emits into the atmosphere a mixture of $CO_2$ and $H_2O$ coming from the second check valve (19), and $N_2$, $H_2O$, and atmospheric $CO_2$ coming from the outlet of turbine VGT2 (8). That is, it does not emit any gas that is harmful to health which is detrimental to the respiratory process of people and animals.

Embodiment 2: Spark Ignition (SI) Engine with a Premixed Mixture Without Polluting Gas Emissions and with Capture of $CO_2$ Produced and Removal of Atmospheric $CO_2$ Embodiment 2 is indicated for spark ignition (SI) engines with a premixed (homogeneous) mixture with capture of atmospheric and produced $CO_2$. Therefore, it is within the category of engines that remove $CO_2$ from the atmosphere (emissions rate <0). Embodiment 2 is based on a process of deflagration combustion, with subsonic speed and without self-ignition of the mixture, for the production of net mechanical power.

The degree of charge (percentage of the maximum torque) of the engine is controlled by the $O_2$ production rate in the MIEC membrane (6). This reduces pumping losses as it eliminates the use of throttling butterfly valves to throttle airflow.

The combustion temperature is controlled by dilution of the mixture of oxidizing agent ($O_2$) and fuel (HxCyOz) with $CO_2$ and $H_2O$ from the actual combustion and pre-cooling. This prevents using fuel for this task (standard practice in SI engines today at a high rotating speed and maximum power).

Embodiment 2 proposes capturing the $CO_2$ emitted by the engine and reducing the content of atmospheric $CO_2$ as efficiently as possible. Furthermore, it eliminates polluting gas (CO, THCs, PM and NOx) emissions at the source (combustion chamber) or in the MIEC membrane, minimizing the need for post-treatment to clean the exhaust gases, which represents considerable savings in the production cost of the engine. At present, post-treatment for cleaning gases is estimated to be in the order of 30% of the total cost of the power assembly. Furthermore, oxy-combustion assures that polluting gases are not emitted during the cold starting process either. This does not occur in engines today given the time needed to heat up (activate) the post-treatment systems for cleaning exhaust gases.

Figure 2A:
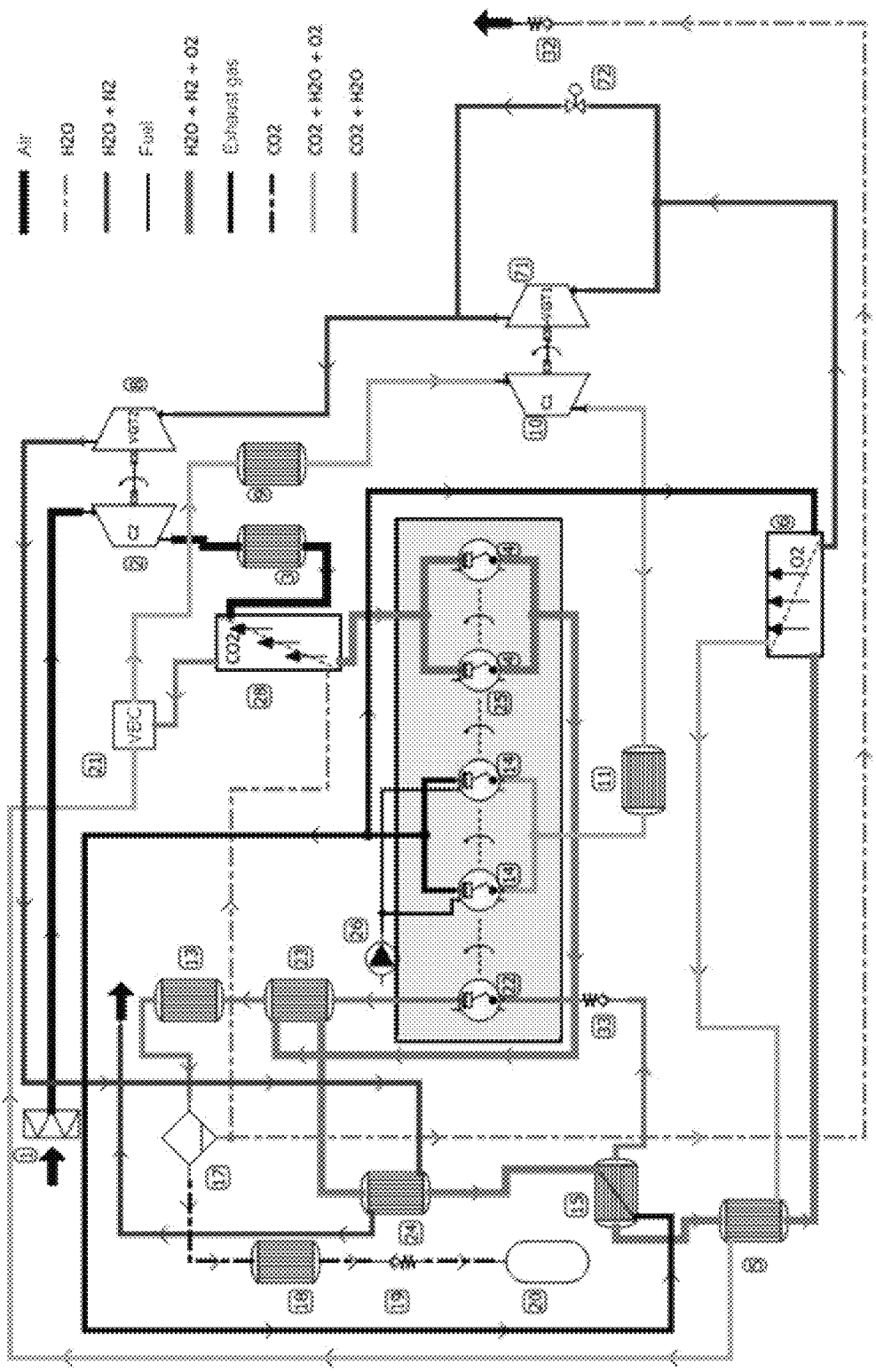
FIG. 2a shows a diagram of a premixed oxy-combustion engine according to a second preferred embodiment of the present invention, with a homogeneous and stoichiometric mixture, high specific power, high efficiency, without the emission of gases that are harmful to health, with a MIEC to separate the $O_2$ from the air, with a polymer membrane to separate $CO_2$, and with negative net $CO_2$ emissions.
Figure 2B:
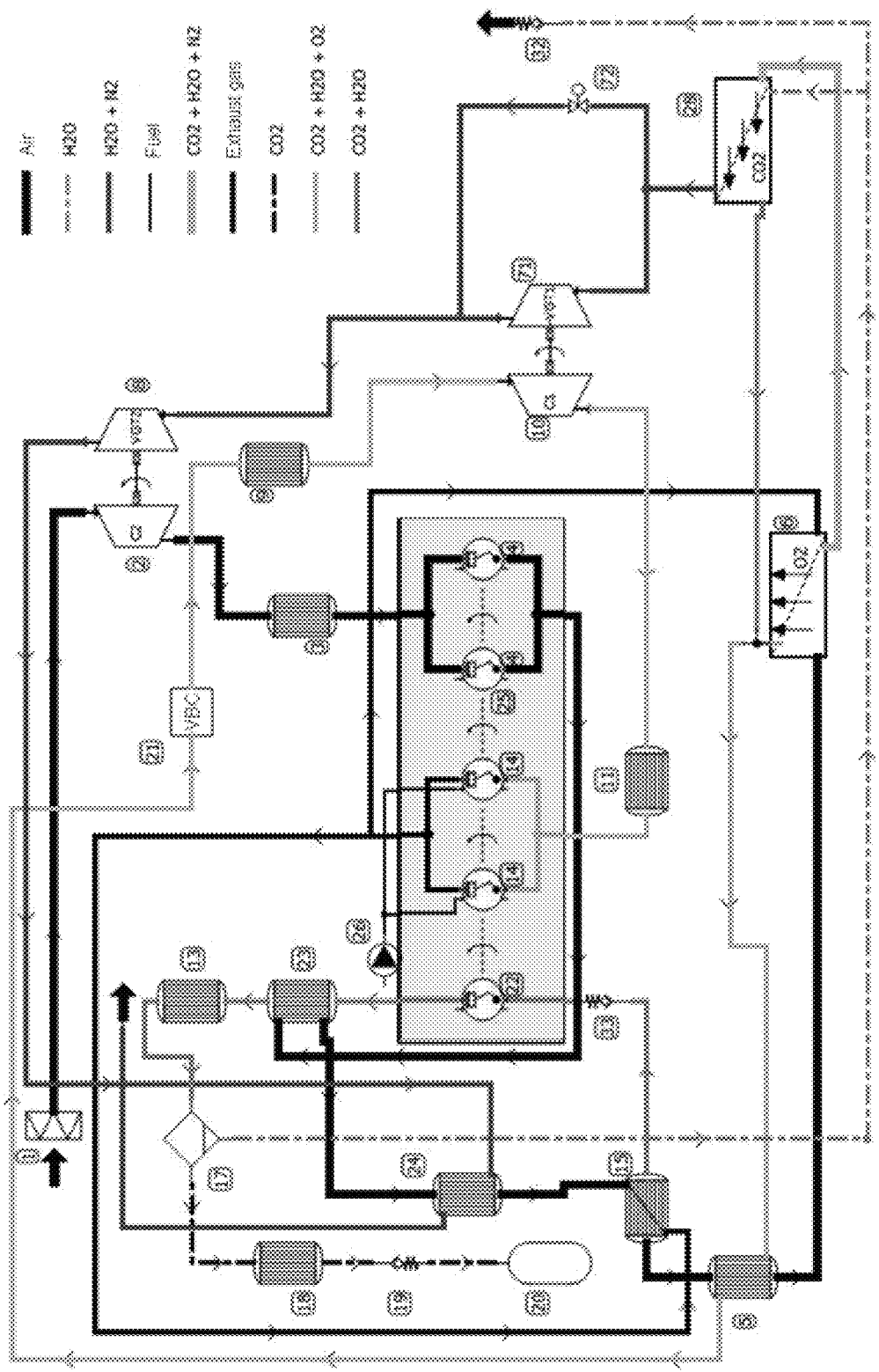
FIG. 2b shows a diagram of a premixed oxy-combustion engine according to an alternative of the engine shown in FIG. 2a, with a homogeneous and stoichiometric mixture, high specific power, high efficiency, without the emission of gases that are harmful to health, with a MIEC to separate the $O_2$ from the air, with a membrane based on molten carbonates to separate the $CO_2$ from the air, and with negative net $CO_2$ emissions.

Embodiment 2 is depicted in FIGS. 2a and 2b depending on the technology used for extracting the $CO_2$ from the air current. In embodiment 2, atmospheric air enters the engine through a filter (1) suctioned by a compressor (C2) (2). Compressor C2 (2) is part of a turbo assembly and is mechanically coupled to a variable geometry turbine (VGT2) (8). Compressor C2 (2) transfers air using the energy recovered by turbine VGT2 (8) from the $N_2+H_2O$ rejected in the MIEC membrane (6) in the case of FIG. 2a, or from the $N_2+H_2O$ rejected in a $CO_2$ membrane (28) in the case of FIG. 2b. Under rated conditions, the air at the outlet of compressor C2 (2) has a pressure and a temperature of about 0.4 MPa and 473 K (199.85° C.). The air passes through a first water-cooler of air charge (WCAC) (3) of the engine. At the outlet of the first WCAC cooler (3), the temperature drops to about 323 K (49.85° C.), which makes the subsequent compression in the first cylinders (4) of the engine more isothermal.

Figure 5A:
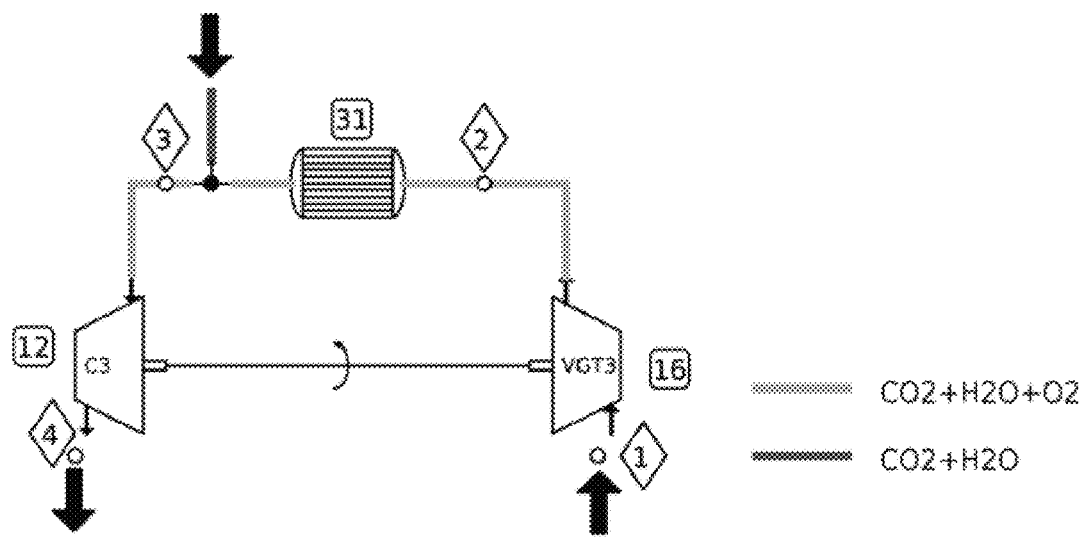
FIG. 5a shows a diagram of the vacuum Brayton cycle (VBC).

In the embodiment of FIG. 2a, the air is cleaned of $CO_2$ in a $CO_2$ polymer membrane (28) with an overall $CO_2/N_2$ selectivity of around 2000 at the working temperature at the outlet of the first WCAC cooler (3). This is achieved in FIG. 2a as a result of the fact that the $CO_2$ going through the membrane is entrained by the water vapor from a separator (17) that lowers the partial pressure of the permeated atmospheric $CO_2$ in the $CO_2$ membrane (28). In FIG. 2a, the atmospheric $CO_2$ and the water used to sweep the $CO_2$ membrane (28) pooled together with the current of $O_2$ and combustion products in means for carrying out a vacuum Brayton cycle (VBC) (21). Namely, this is produced at the outlet of a fifth WCAC cooler (31) as shown in FIG. 5a, which depicts the internal detail of the VBC cycle and will be explained below.

In another preferred embodiment shown in FIG. 2b, the air does not encounter any $CO_2$ membrane at the outlet of the first WCAC cooler (3) and, therefore, the content of $CO_2$ in the air does not change. For this other version of embodiment 2, this $CO_2$ is collected downstream.

The air is subsequently suctioned by the first cylinders (4) of the engine. In embodiment 2, a 5-cylinder, 4-stroke engine is depicted, and there are 2 cylinders that suction the air. The first cylinders (4) act like pumps compressing the air to about 0.9 MPa and 473 K (199.85° C.). The first cylinders (4) are preferably identical to the remaining cylinders of the engine, sharing the crankshaft (25), the camshaft, and the valve timing gear, and having as a unique singularity that fuel is not injected therein. Since it is a 4-stroke engine, the air remains inside the first cylinders (4) for 4 strokes, so it is compressed and cooled with the engine cooling water (at about 363 K (89.85° C.)), which contributes to making the compression more isothermal. These first cylinders (4) work as a starting system for the turbomachine assembly to start up the cycle airflow and turbines. They are moved to that end until the startup of the system by a conventional starting motor of the type used in reciprocating engines.

At the outlet of the first cylinders (4), the air is heated in a first regenerative heat exchanger (23) which lowers its pressure to about 0.87 MPa and raises its temperature to about 573 K (299.85° C.), using to that end the thermal energy from a flow of $CO_2$ and of $H_2O$ at the outlet of an additional piston (22). At the outlet of the first regenerative heat exchanger (23), the air is heated in a third regenerative heat exchanger (24) which lowers its pressure to about 0.85 MPa and raises its temperature to about 673 K (399.85° C.), using to that end the thermal energy from a flow of $N_2$ at an approximate temperature of 800 K (526.85° C.) and a pressure of 0.1 MPa from the outlet of turbine VGT2 (8).

At the outlet of the third regenerative heat exchanger (24), the air is heated again in a catalytic MIEC membrane (15) which lowers its pressure to about 0.8 MPa and raises its temperature to about 723 K (449.85° C.), using to that end the thermal energy from exhaust gases from the combustion of the second cylinders (14). In the catalytic MIEC membrane (15), the exhaust gases transfer their heat to the air (acting like a regenerative heat exchanger) and both CO and HC oxidize until the entire gas flow is made up of only $CO_2$ and $H_2O$. The need for post-treatment to clean gases of this engine is thereby reduced by 20%, since this exhaust gas flow represents about 20% of the total flow volume of exhaust gases transferred by the engine. After the catalytic MIEC membrane (15), the air is heated again in a second regenerative heat exchanger (5) which lowers its pressure to about 0.8 MPa and raises its temperature to about 873 K (599.85° C.), using to that end the thermal energy from the $O_2$ obtained from the air by the MIEC membrane (6) and from $CO_2$ used to entrain the $O_2$ going through the MIEC membrane (6) and to lower the partial pressure of $O_2$ in the entrainment chamber.

After the second regenerative heat exchanger (5), the air at 0.8 MPa and 873 K (599.85° C.) is injected into the $O_2$ MIEC membrane (6) where it reaches the working temperature of the MIEC membrane (6) (about 1173 K (899.85° C.)) as a result of the heat exchange with the $CO_2$ and the $H_2O$ coming from the oxy-combustion process and used to sweep the $O_2$ side.

In the case of the embodiment of FIG. 2b, the $O_2$-depleted air, rejected in the $O_2$ MIEC membrane (6) enters a $CO_2$ membrane (28) (based on molten carbonates with an overall $CO_2/N_2$ selectivity of around 2500 at the working temperature) at about 1173 K (899.85° C.) and 0.8 MPa where atmospheric $CO_2$ is separated from the current of $N_2+H_2O$. This is achieved as a result of the fact that the $CO_2$ is swept away by the water vapor from the separator (17) which lowers the partial pressure of the atmospheric $CO_2$ permeated in the membrane. In FIG. 2b, the permeated atmospheric $CO_2$ is pooled with the mixture of $O_2$ produced by the MIEC membrane (6) and $CO_2$ and $H_2O$ from the combustion of the second cylinders (14) and used to sweep the MIEC membrane (6) and lower the partial pressure of $O_2$.

In the other version of the preferred embodiment shown in FIG. 2a, the rejection from the $O_2$ MIEC membrane (6) does not encounter any $CO_2$ membrane downstream, because the air has already been previously cleaned of $CO_2$ in the $CO_2$ membrane (28), as explained above.

The rejection from the $O_2$ MIEC membrane (6) in the case of the embodiment of FIG. 2a and the rejection from the $CO_2$ membrane (28) in the embodiment of FIG. 2b are both virtually free from atmospheric $CO_2$ and are atmospheric $N_2+H_2O$ at 0.75 MPa and 1173 K (899.85° C.). Each of said rejections represents about 80% of the mass of air transferred by the system and are passed through turbine VGT1 (71) and/or through the control valve (72).

Turbine VGT1 (71) and the control valve (72) are part of a turbo assembly together with compressor C1 (10), to which turbine VGT1 (71) is mechanically linked. Turbine VGT1 (71) harnesses the energy from the flow of $N_2$ rejected from the MIEC membrane (6), recovering its energy to move compressor C1 (10). The control valve (72) regulates the flow of energy to compressor C1 (10). Compressor C1 (10) transfers the sweeping $CO_2$ of the MIEC membrane (6), therefore transferring a mixture of $CO_2$, $H_2O$, and $O_2$. Compressor C1 (10) transfers about 95% of the gas flow of the engine. As a consequence, the control valve (72) regulates the flow of $CO_2$ and $H_2O$ used to dilute the $O_2$ and, hence, the combustion temperature and the exhaust gas combustion temperature. In conclusion, the temperature of the exhaust gases of the engine at the outlet of the second cylinders (14) is regulated by the control valve (72), and it is regulated at an approximate value of 1273 K (999.85° C.) under rated conditions.

The control valve (72) usually works being partially open so as to regulate the pressure of compressor C1 (10). A part of the $N_2$ rejected in the MIEC membrane (6) circulates through turbine VGT1 (71), being expanded and cooled. The other part of the rejected $N_2$ circulates through the actual control valve (72), without being cooled down. This other part of the $N_2$ is mixed downstream of turbine VGT1 (71) with the cold and expanded $N_2$, reheating it, and accordingly increasing its temperature.

After passing through the control valve (72) and/or through the turbine (71) the $N_2+H_2O$ rejection from the MIEC membranes (80% of the airflow) is harnessed in variable geometry turbine VGT2 (8), which is used to move compressor C2 (2). The approximate rated inlet conditions relative to turbine VGT2 (8) are 0.3 MPa and 823 K (549.85° C.). The variable geometry of turbine VGT2 (8) is used to regulate the degree of charge of the combustion engine. When turbine VGT2 (8) is closed, it increases the airflow through the MIEC membrane (6) and the working pressure in the MIEC membrane (6). It therefore increases the hourly production of $O_2$ and the amount of fuel that can be injected under stoichiometric conditions. The inverse happens when turbine VGT2 (8) is opened. The minimum size (minimum opening) of turbine VGT2 (8) is chosen in accordance with the cylinder capacity of the reciprocating engine to set the maximum power of the system at each rotating speed of the engine. The maximum opening of turbine VGT2 (8) determines the minimum charge (idle) of the reciprocating engine at each rotating speed. Turbine VGT2 (8) can also comprise a wastegate (or WG) valve. When turbine VGT2 (8) or its wastegate valve are opened to the maximum, the energy of compressor C2 (2) is reduced to zero whereby both the working pressure of the MIEC membrane and the flow volume of transferred air are considerably reduced.

If the engine charge is to be reduced even more, until lowering it to zero, then the control valve (72) is opened, avoiding turbine VGT1 (71), so the energy of compressor C1 (10) is reduced to zero. In this case the flow of $CO_2$ and $H_2O$ to the MIEC membrane (6) is detained. This equals out the partial pressure of $O_2$ on both sides of the MIEC membrane (6) and detains the flow of $O_2$ production, leaving the engine charge of this embodiment 2 idle.

At the outlet of turbine VGT2 (8), the mixture of $N_2$ and $H_2O$ at a pressure of about 0.1 MPa and temperature of about 800 K (526.85° C.) is passed through the third regenerative heat exchanger (24) to transfer its heat to the air before discharging this mixture of gases (free from gases that are harmful to health) into the atmosphere.

The mixture of $O_2$, exchanged by the MIEC membrane (6), and of $CO_2$ and $H_2O$, used to sweep and lower the partial pressure of $O_2$ going through the membrane, exits at the corresponding end of the MIEC membrane (6), to the second combustion cylinders (14), suctioned by compressor C1 (10). For the version of embodiment 2 based on membranes of molten carbonates for collecting atmospheric $CO_2$ (FIG. 2b), it is at this point (at the outlet of the MIEC membrane (6)) where said mixture (mixture of $O_2$, exchanged by the MIEC membrane (6), and of $CO_2$ and $H_2O$, used to sweep and lower the partial pressure of $O_2$ going through the membrane) is in turn mixed with the atmospheric $CO_2$ and the water vapor used to sweep same. This mixture exits at a rated pressure and temperature of about 0.1 MPa and 1173 K (899.85° C.), respectively, and represents about 80% of the flow volume of air transferred by the engine. The heat of the mixture of $CO_2$, $H_2O$, and $O_2$ is recovered first in the second regenerative heat exchanger (5) to heat the air at the outlet of the catalytic MIEC membrane (15). At the outlet of the second regenerative heat exchanger (5), there are rated conditions of about 0.08 MPa and 723 K (449.85° C.).

Figure 5B:
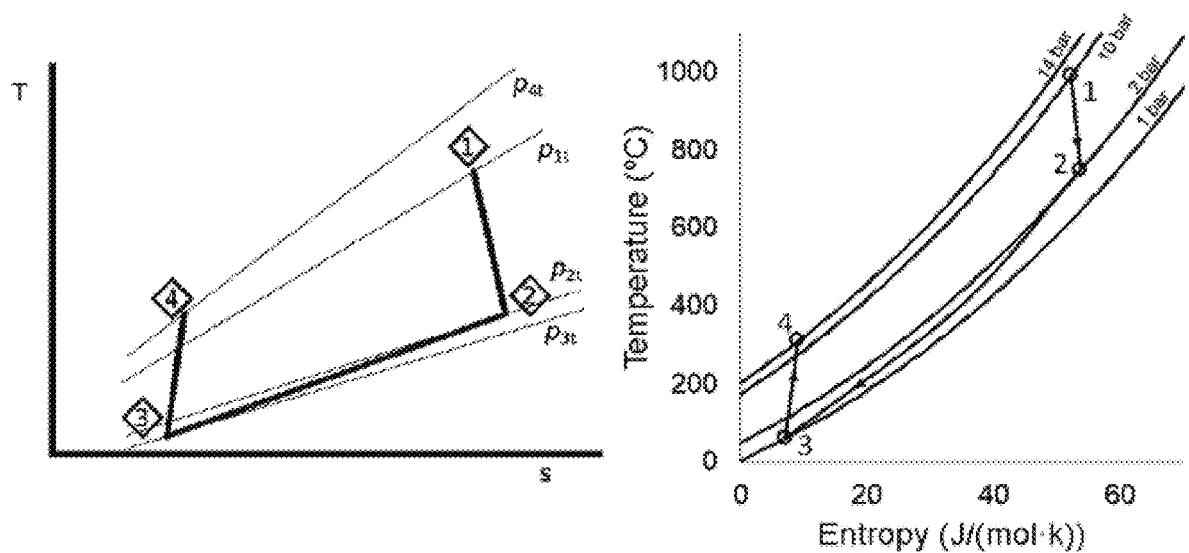
FIG. 5b shows a T-s diagram of the vacuum Brayton cycle (VBC) idealized and calculated for a specific situation.

Next, the mixture flows through means for carrying out a vacuum Brayton cycle (VBC) (21). The means for carrying out a vacuum Brayton cycle (VBC) (21) have the function of cooling the mixture by transforming its temperature into pressure and recovering the pressure loss caused by the second regenerative heat exchanger (5). The means for carrying out a vacuum Brayton cycle (VBC) (21) are made up of a turbine VGT3 (16) mechanically coupled with a compressor C3 (12) with which it forms a turbo assembly. Between the outlet of turbine VGT3 (16) and the inlet of compressor C3 (12) there is a fifth WCAC cooler (31). For the version of embodiment 2 based on polymer membranes for collecting atmospheric $CO_2$ (FIG. 2a), it is at the outlet of the fifth WCAC cooler (31) where the $O_2$ and $CO_2$ from combustion are mixed with the atmospheric $CO_2$ and the water used to sweep same. In FIG. 2b, atmospheric $CO_2$ is now part of the oxidizing mixture at this point. The internal detail of the means for carrying out a vacuum Brayton cycle (VBC) (21) can be seen in FIG. 5a and the operating cycle thereof can be seen in the T-s diagram of FIG. 5b. The mixture of $CO_2$, $H_2O$, and $O_2$ is expanded so as to harness the energy thereof in turbine VGT3 (16), cooled in the fifth WCAC cooler (31), sustaining a slight loss in charge, and compressed in compressor C3 (12), mechanically coupled with turbine VGT3 (16). At the outlet of compressor C3 (12), the mixture is colder and at a higher pressure than at the inlet of turbine VGT3 (16).

The rated conditions of the oxidizing mixture at the outlet of compressor C3 (12) are about 0.1 MPa and 523 K (249.85° C.). The oxidizing mixture, continuing its path to the second cylinders (14), is cooled in the second WCAC cooler (9) to 323 K (49.85° C.). Next, it is compressed in compressor C1 (10) to 0.3 MPa and 473 K (199.85° C.), with the conditions of compressor C1 (10) being those imposed by the control valve (72) to keep the temperature of the exhaust gases around 1273 K (999.85° C.), as has already been described. After compressor C1 (10), the mixture of $CO_2$, $H_2O$, and $O_2$ is cooled again in the third WCAC cooler (11) to 323 K (49.85° C.) before being suctioned by the second cylinders (14). These cylinders are 2 of the 5 cylinders in the four-stroke engine used as an example, as established at the beginning of the description of embodiment 2.

In the second cylinders (14), a hydrocarbon HxCyOz is injected with a fuel pump (26) into the oxidizing mixture of $CO_2$, $H_2O$, and $O_2$ in a proportion that is stoichiometric with $O_2$. In said second cylinders (14), a spark ignition premixed combustion cycle, and a cycle similar to the Otto cycle is performed. The second cylinders (14) produce energy to move the first cylinders (4) that transfer air for the MIEC membrane (6) and the additional piston (22), which compresses so as to densify the residual $CO_2$ and $H_2O$, as they are all coupled on the same crankshaft (25). The second cylinders (14) furthermore produce a surplus of net mechanical energy used to move the vehicle to which the engine is coupled, or the electric generator or any application requiring an input of mechanical energy through a shaft. These second cylinders (14) work as a starting system for the turbomachine assembly to start up the cycle airflow and turbines. They are moved to that end until the startup of the system by a conventional starting motor of the type used in reciprocating engines.

The transfers of heat to the water of the first WCAC cooler (3), second WCAC cooler (9), third WCAC cooler (11), fourth WCAC cooler (13), fifth WCAC cooler (31), and sixth WCAC cooler (18) plus the heat transferred in the regenerations (produced in the first regenerative heat exchanger (23), second regenerative heat exchanger (5), third regenerative heat exchanger (24), and in the catalytic MIEC (15)) together with the densification and capture of the surplus $CO_2$ and $H_2O$, represent the complete transfer of heat to the cold source necessary for the proposed thermodynamic cycle to comply with the second law of thermodynamics and to therefore be viable. In turn, transfers of heat in the first WCAC cooler (3), second WCAC cooler (9), third WCAC cooler (11), fourth WCAC cooler (13), fifth WCAC cooler (31), and sixth WCAC cooler (18), and in the regenerations (produced in the first regenerative heat exchanger (23), second regenerative heat exchanger (5), third regenerative heat exchanger (24), and in the catalytic MIEC (15)) contribute to minimizing the destruction of exergy of the thermodynamic cycle due, on one hand, to making the overall compression process of the working fluid more isothermal and, on the other hand, to recovering the energy from exhaust gases for the separation from the air. The approximation to isothermal compression and the use of regenerative heat exchangers for extracting the heat from $CO_2+H_2O$ approximate the $N_2$ cycle in the MIEC membrane (6) to a cycle with a yield equal to the Carnot cycle known as the Ericsson cycle. The cycle of the mixture of $CO_2+H_2O+O_2$ can be assimilated to a closed Brayton cycle with intermediate compressions and expansions but nested with an Otto cycle in the second cylinders (14), which has not been described up until now in the literature. Essentially, the quasi-closed Brayton cycle nested with the Otto cycle and binary relative to the $N_2$ cycle (by sending heat to the $N_2$ cycle, it complies with the thermodynamic principles for approximating an ideal cycle of maximum efficiency, such as the Ericsson cycle) is a novel embodiment of a binary cycle, complying with the principles of the other ideal cycle of maximum efficiency, the Carnot cycle.

As a result of the combustion of the hydrocarbon (fuel) with the oxidizing mixture ($CO_2$, $H_2O$, $O_2$), a mixture of $CO_2$, $H_2O$, unburned THCs, and CO is produced at the outlet of the second cylinders (14). On one hand, 80% of these exhaust gases is suctioned by compressor C1 (10) and the second cylinders (14) themselves in order to pass through the MIEC membrane (6). In the MIEC membrane (6), on one hand, it performs the function of sweeping and lowering the partial pressure of $O_2$ to improve the transport of $O_2$ of the MIEC membrane (6); on the other hand, the mixture with $CO_2$ reduces the combustion temperature to limits that are tolerable for the materials of reciprocating internal combustion engines (RICE). Therefore, at the outlet of the MIEC membrane (6) the cycle is closed, and the mixture returns to the inlet of the second regenerative heat exchanger (5) so as to transmit its heat to the air. In the described process, the engine works in an efficient manner both by keeping the air/fuel ratio close to the stoichiometric ratio at all times and by regulating its charge without throttling the flow, but rather modulating the production of $O_2$ of the membrane. The productivity of the membrane instantaneously responds to engine accelerations since the first cylinders (4) are mechanically coupled on the same shaft with the second cylinders (14). Therefore, the dynamic response of the engine is not conditioned by the turbosupercharged RICE lag due to the mechanical inertia of the turbo assembly.

On the other hand, the remaining 20% of the exhaust gases, which are a mixture of: $CO_2$, $H_2O$, unburned THCs and CO, is oxidized with the $O_2$ left over from combustion in the catalytic MIEC membrane (15) where they enter at an approximate temperature of 1273 K (999.85° C.) and transfer their heat to 100% of the airflow transferred by the engine, whereby its temperature drops considerably to about 703 K (429.85° C.). At the same time, and due to the chemical reactions that are produced in the catalytic MIEC membrane (15), the CO and THCs are oxidized with the $O_2$ left over from combustion to $CO_2$ and $H_2O$ vapor, and, again, due to oxy-combustion, the production of NOx in the second cylinders (14) is prevented. Therefore, the mixture is discharged without any gas that is harmful to health (without CO, without THCs, and without NOx).

Next, a first check valve (33) is installed to prevent the outlet of backflows from the additional piston (22). The additional piston (22) is moved by the crankshaft (25) and compresses this 20% of the flow volume (the mentioned remaining 20% of the exhaust gases) to 7.5 MPa. The pressure of 7.5 MPa is regulated by a second check valve (19) and its setting spring. Compression is performed in a quasi-isothermal manner in the four strokes of the additional piston (22), from the time the intake valve opens to suction the mixture of $CO_2$ and $H_2O$ vapor until the exhaust valve opens to discharge same. The mixture compressed to 7.5 MPa is discharged at a temperature of about 673 K (399.85° C.) and must be kept above 573 K (299.85° C.), which is the saturation temperature of water at 7.5 MPa, to assure that said mixture is still in a gas state inside the additional piston (22).

The mixture is cooled first in the first regenerative heat exchanger (23) and then in the fourth WCAC cooler (13) to 473 K (199.85° C.), so the $H_2O$ transitions to a liquid state. The mass of liquid water at 7.5 MPa and 473 K (199.85° C.) represents about 2% of the total flow volume of mass transferred by the engine. Next, the liquid water is separated from the $CO_2$ gas in the separator (17), which can be an inertial separator with a pressure lamination valve at the outlet. A polymer membrane can also be used as a separator (17) if the water is kept in a gas state. The energy from the water separated at a pressure of about 0.1 MPa and 473 K (199.85° C.) is harnessed, being used as a drive fluid in the $CO_2$ membrane (28). Water vapor sweeps the $CO_2$ side, lowering its partial pressure by dilution. A third check valve (32), connecting the circuit of $H_2O$ coming from combustion with the atmosphere, regulates the pressure of the water vapor, keeping it equal to barometric pressure. Furthermore, it allows the excess water vapor generated in successive engine combustions to be purged into the atmosphere.

After the $H_2O$ is separated, the excess $CO_2$, with an already high purity, is cooled in a sixth WCAC cooler (18) below its critical temperature, 303 K (29.85° C.). The liquid $CO_2$ passes through the second check valve (19) and is stored at 7.5 MPa in a first tank (20) with controlled temperature below 303 K (29.85° C.). When this tank is filled, engine autonomy ends. The tank is kept at subcritical temperatures of $CO_2$ (<303 K (29.85° C.)) using, if necessary, a cooling circuit such as the one produced by the air conditioning of the vehicle. The tank is discharged in the service station, being exchanged for a fuel tank. The liquid $CO_2$ can again be converted into a hydrocarbon (like in synthetic fuels called e-Diesel, Blue-crude, etc.), be supplied as a product to the chemical industry, be supplied as a coolant fluid to the cooling industry or be stored in controlled catch basins. However, it is not emitted into the atmosphere. The non-emission of the $CO_2$ into the atmosphere allows determining that the present embodiment 2 is an engine with negative net emissions as it has removed atmospheric $CO_2$ and has not emitted the $CO_2$ produced in the combustion process thereof.

Embodiment 3: Compression Ignition (CI) Engine with a Stratified Mixture and Diffusion Combustion, with an Effective Variable Compression Ratio Controlled by the $O_2$ Production Rate; Without Polluting Gas Emissions and Without the Capture of $CO_2$ Embodiment 3 is indicated for compression ignition (CI) engines with a stratified mixture (diffusion combustion) without the emission of pollutants and without the capture of $CO_2$. For the production of net mechanical power, embodiment 3 is based on a diffusion combustion process, with self-ignition by detonation of the premixture and combustion speed controlled by the amount of movement of fuel streams.

The degree of supercharging affects the percentage of the maximum torque in each regime through the effective compression ratio of the cycle. This effective compression ratio is variable and is controlled by the $O_2$ production rate in the MIEC membrane. This represents a concept of size reduction, where the cylinder capacity of the engine can be reduced and the effective compression process of the air in turbomachines and cylinders can approximate the isothermal process.

The combustion temperature is controlled by dilution of the pre-cooled mixture of oxidizing agent ($O_2$) and fuel (HxCyOz) with $CO_2$ and $H_2O$ from combustion itself. This mixture with high rates of exhaust gas recirculation (EGR) also helps to increase the $O_2$ production rate in the $O_2$ MIEC membrane (6) by lowering the partial pressure thereof.

Embodiment 3 does not propose capturing the $CO_2$ emitted by the engine but rather eliminating polluting gas (CO, THCs, PM, and NOx) emissions at the source (combustion chamber) or in the MIEC membrane, without a need for post-treatment to clean the exhaust gases, which represents considerable savings in the production cost of the engine. At present, post-treatment for cleaning gases is estimated to be in the order of 30% of the total cost of the power assembly. Furthermore, oxy-combustion assures that polluting gases are not emitted during the cold starting process either. This does not occur in engines today given the time needed to heat up (activate) post-treatment systems for cleaning exhaust gases.

Figure 3:
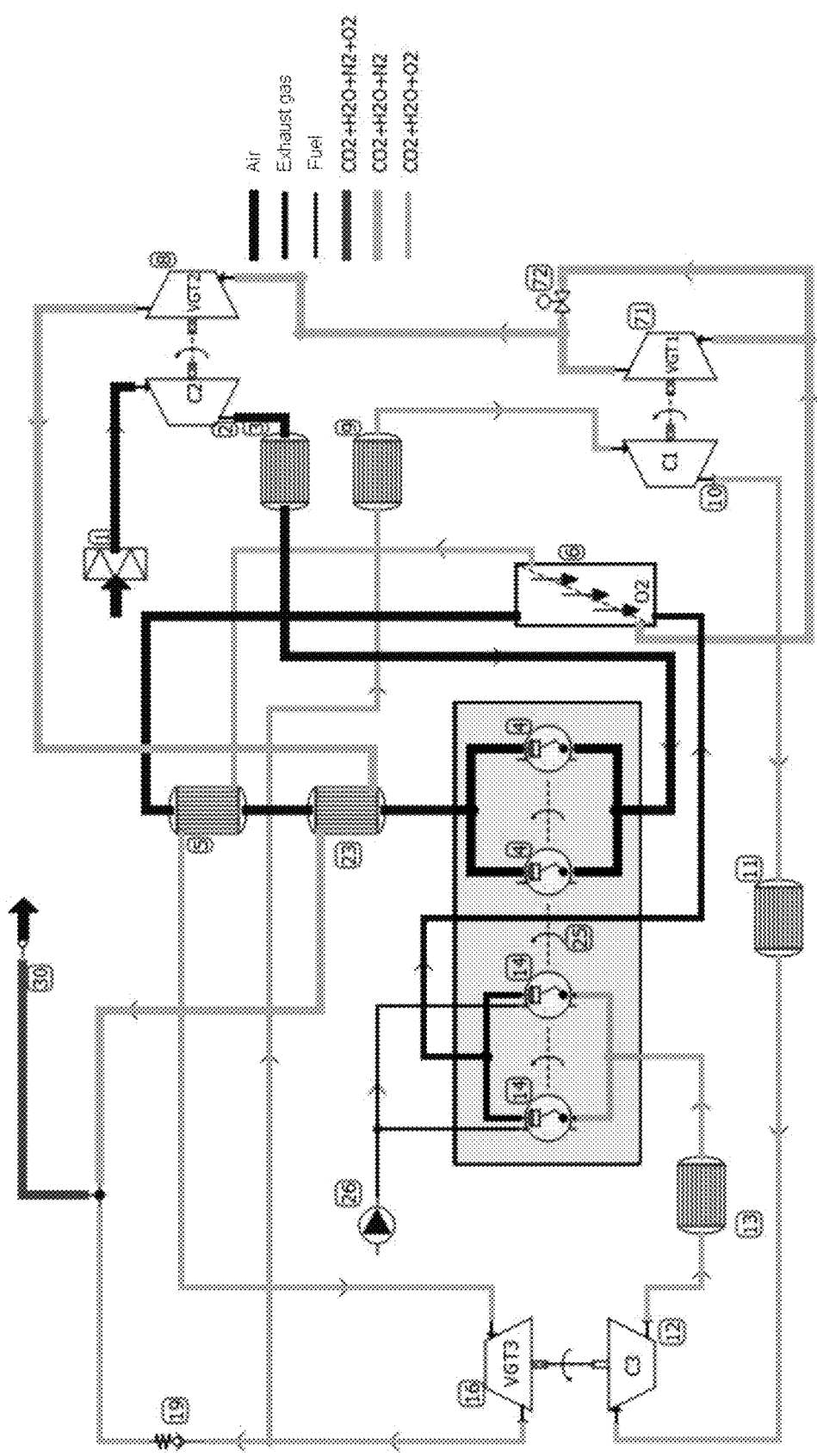
FIG. 3 shows a diagram of a diffusion oxy-combustion engine according to a third preferred embodiment of the present invention, with a stratified and lean mixture, high specific power, high efficiency, with a MIEC to separate the $O_2$ from the air, without the emission of gases that are harmful to health but with positive net $CO_2$ emissions.

Embodiment 3 is depicted in FIG. 3. In embodiment 3, atmospheric air enters the engine through a filter (1) suctioned by a compressor (C2) (2). Compressor C2 (2) is part of a turbo assembly and is mechanically coupled to a variable geometry turbine (VGT2) (8). Compressor C2 (2) transfers air using the energy recovered by turbine VGT2 (8) from the $N_2$ rejected in the MIEC membrane (6). Under rated conditions, the air at the outlet of compressor C2 (2) has a pressure and a temperature of about 0.4 MPa and 473 K (199.85° C.). The air passes through a first water-cooler of air charge (WCAC) (3) of the engine. At the outlet of the first WCAC cooler (3), the temperature drops to about 323 K (49.85° C.), which makes the subsequent compression in the first cylinders (4) of the engine more isothermal.

The air is subsequently suctioned by half of the first cylinders (4) of the engine. Embodiment 3 depicts a 4-cylinder, 4-stroke engine, so there are 2 cylinders that suction the air. The first cylinders (4) act like pumps compressing the air to about 0.8 MPa and 473 K (199.85° C.). The first cylinders (4) are preferably identical to the remaining cylinders of the engine, sharing the crankshaft (25), the camshaft, and the valve timing gear, and having as a unique singularity that fuel is not injected therein. Since it is a 4-stroke engine, the air remains inside the first cylinders (4) for 4 strokes, so it is compressed and cooled with the engine cooling water (at about 363 K (89.85° C.)), which contributes to making the compression more isothermal. These first cylinders (4) work as a starting system for the turbomachine assembly to start up the cycle airflow and turbines. They are moved to that end until the startup of the system by a conventional starting motor of the type used in reciprocating engines.

At the outlet of the first cylinders (4), the air is heated in a first regenerative heat exchanger (23) which lowers its pressure to 0.77 MPa and raises its temperature to about 673 K (399.85° C.), using to that end the thermal energy from a flow of $CO_2$, $H_2O$ and $N_2$. This flow of $N_2$, $CO_2$, and $H_2O$ exits into the atmosphere through the conduit (30) located downstream of turbine VGT2 (8). This flow of $N_2$, $CO_2$, and $H_2O$ represents about 80% of the total flow volume of air transferred by the engine and is at an approximate temperature of 800 K (526.85° C.) and a pressure of 0.1 MPa. At the outlet of the first regenerative heat exchanger (23), the air is heated in a second regenerative heat exchanger (5) which raises its temperature to about 973 K (699.85° C.), using to that end the thermal energy from the $O_2$ produced by the MIEC membrane (6) and from $CO_2$ used to sweep the MIEC membrane (6) and to lower the partial pressure of $O_2$. After the second regenerative heat exchanger (5), the air at a pressure of 0.75 MPa enters the MIEC membrane (6) where it reaches the working temperature of the MIEC membrane (6) (about 1223 K (949.85° C.)) as a result of the heat exchange with the $CO_2$ and the $H_2O$ coming from the oxy-combustion process and used to sweep the $O_2$.

The rejection from the MIEC membrane (6) is fundamentally $N_2$ at 0.7 MPa and 1173 K (899.85° C.); it represents about 80% of the mass of air transferred by the system and passes through turbine VGT1 (71) and/or through the control valve (72). Turbine VGT1 (71) and the control valve (72) are part of a turbo assembly together with compressor C1 (10), to which turbine VGT1 (71) is mechanically linked. Turbine VGT1 (71) harnesses the energy from the flow of $N_2$ rejected from the MIEC membrane (6), recovering its energy to move compressor C1 (10). The control valve (72) regulates the flow of energy to compressor C1 (10). Compressor C1 (10) transfers the sweeping $CO_2+H_2O$ of the MIEC membrane (6), therefore transferring a mixture of $CO_2$, $H_2O$, and $O_2$. Compressor C1 (10) transfers about 95% of the gas flow of the engine. As a consequence, the control valve (72) regulates the flow of $CO_2$ and $H_2O$ used to dilute the $O_2$ and, hence, the combustion temperature and the exhaust gas combustion temperature. In conclusion, the temperature of the exhaust gases of the engine at the outlet of the second cylinders (14) is regulated by the control valve (72), and it is regulated at an approximate value of 1223 K (949.85° C.) under rated conditions.

The control valve (72) usually works being partially open so as to regulate the pressure of compressor C1 (10). A part of the $N_2$ rejected in the MIEC membrane (6) circulates through turbine VGT1 (71), being expanded and cooled. The other part of the rejected $N_2$ circulates through the actual control valve (72), without being cooled down. This other part of the $N_2$ is mixed downstream of turbine VGT1 (71) with the cold and expanded $N_2$, reheating it, and accordingly increasing its temperature.

After passing through the control valve (72) and/or through the turbine (71) the $N_2$ rejection from the MIEC membrane (6) (80% of the airflow) is harnessed in variable geometry turbine VGT2 (8), which is used to move compressor C2 (2). The approximate rated inlet conditions relative to turbine VGT2 (8) are 0.3 MPa and 823 K (549.85° C.). The variable geometry of turbine VGT2 (8) is used to regulate the flow volume of air transferred by the MIEC membrane (6) and therefore the flow volume of $O_2$ produced. When turbine VGT2 (8) is closed, it increases the airflow through the MIEC membrane (6) and the working pressure in the MIEC membrane (6). It therefore increases the hourly production of $O_2$ (with the rate being the same) and the amount of fuel that may be injected under stoichiometric conditions. The inverse happens when turbine VGT2 (8) is opened. The minimum size (minimum opening) of turbine VGT2 (8) is chosen in accordance with the cylinder capacity of the reciprocating engine to set the maximum power of the system at each rotating speed of the engine. The maximum opening of turbine VGT2 (8) determines the minimum flow volume of $O_2$ (idle) of the reciprocating engine at each rotating speed. Turbine VGT2 (8) can also comprise a wastegate (or WG) valve. When turbine VGT2 (8) or its wastegate valve are opened to the maximum, the energy of compressor C2 (2) is reduced to zero whereby both the working pressure of the MIEC membrane and the flow volume of transferred air are considerably reduced.

If the flow volume of $O_2$ of the engine is to be reduced even more, until lowering it to zero, then the control valve (72) is opened, avoiding turbine VGT1 (71), so the energy of compressor C1 (10) is reduced to zero. This virtually equals out the partial pressure of $O_2$ on both sides of the MIEC membrane (6) and minimizes the $O_2$ production rate, leaving the engine charge of this embodiment 3 idle.

It can be said that the control valve (72) provides a qualitative regulation of the flow of $O_2$ by acting on the production rate, and turbine VGT2 (8) provides a quantitative regulation by acting on the transferred flow volume of air. Both controls provide very broad and very fine-tuned regulation of the effective compression ratio of the cylinder at top dead center of the second cylinders (14) without this changing the volumetric compression ratio thereof. This is commonly known in reciprocating engines as variable compression ratio.

At the outlet of turbine VGT2 (8), the mixture of $N_2$, $CO_2$, and $H_2O$ at a pressure of about 0.1 MPa and temperature of about 800 K (526.85° C.) is passed through the first regenerative heat exchanger (23) to transfer its heat to the air before discharging this mixture of gases (free from gases that are harmful to health) into the atmosphere.

The mixture of $O_2$ produced by the MIEC membrane (6) and of $CO_2$ and $H_2O$, used to sweep it and lower the partial pressure of $O_2$, exits at the corresponding end of the MIEC membrane (6), to the second combustion cylinders (14), suctioned by compressor C1 (10). This mixture exits at a rated pressure and temperature of about 0.35 MPa and 1223 K (949.85° C.), respectively, and represents about 115% of the flow volume of air transferred by the engine. The heat of the mixture of $CO_2$, $H_2O$, and $O_2$ is recovered first in the second regenerative heat exchanger (5) to heat the air coming from the outlet of the first regenerative heat exchanger (23). At the outlet of the second regenerative heat exchanger (5), the oxidizing mixture has rated conditions of about 0.3 MPa and 700 K (426.85° C.). This pressure and temperature are harnessed in a variable geometry turbine (VGT3) (16) used to move a compressor (C3) (12) with which it is mechanically coupled in another turbo assembly. Compressor C3 (12) is used to supercharge the second cylinders (14), such as turbosuperchargers in use, using the energy recovered by turbine VGT3 (16). Turbine VGT3 (16) is regulated to keep the pressure downstream of compressor C3 (12) constant and equal to 0.6 MPa.

Downstream of turbine VGT3 (16), the rated conditions at the outlet of turbine VGT3 (16) are about 0.1 MPa and 473 K (199.85° C.). At the outlet of turbine VGT3 (16) there is a branch-off which discharges the surplus mixture of $CO_2$, $H_2O$ vapor, and $O_2$ into the atmosphere without any polluting gas (without CO, without THCs, and without NOx). This is achieved as a result of catalyzing CO and THCs into $H_2O$ vapor and $CO_2$ which is produced in the MIEC membrane (6) and the oxy-combustion which prevents the production of NOx.

The discharge is performed through a second check valve (19) tared at a pressure of 0.11 MPa to prevent air or $N_2$ from being able to enter the mixture of oxidizing gases during transient processes. Upstream of the second check valve (19), therefore, there is formed a circuit that is closed and separated from the atmosphere. This volume is formed by a circuit of conduits free from $N_2$ acting as a system for accumulating the oxidizing mixture of $CO_2+H_2O+O_2$ after the engine is stopped. This accumulated mixture facilitates later startup of the engine, as there is already a surplus of $O_2$ produced by the MIEC membrane (6), which can be used to start up combustion in the second cylinders (14).

With the branch-off (29) and the second check valve (19), the rated conditions of pressure at the outlet of turbine VGT3 (16) are 0.11 MPa and the temperature is 473 K (199.85° C.). The non-surplus mixture continuing to the second cylinders (14) is cooled in a second WCAC cooler (9) to 323 K (49.85° C.). Next, it is compressed in compressor C1 (10) to 0.3 MPa and 473 K (199.85° C.), with the conditions of compressor C1 (10) being those imposed by the control valve (72) to keep the temperature of the exhaust gases around 1223 K (949.85° C.), as has already been described. After compressor C1 (10), the mixture of $CO_2$, $H_2O$, and $O_2$ is cooled again to 323 K (49.85° C.) in the third WCAC cooler (11) and is compressed in compressor C3 (12) to 0.6 MPa and 473 K (199.85° C.). To that end, the energy of turbine VGT3 (16) which regulates the pressure at the outlet of compressor C3 (12) equal to 0.6 MPa, as has already been described, is used. Lastly, the mixture is cooled again in the fourth WCAC cooler (13) to 323 K (49.85° C.) before being suctioned by the second cylinders (14), with there being 2 in this embodiment as it is half of those of a 4-cylinder, 4-stroke engine which has been used as an example, as established at the beginning of the description of the present embodiment 3.

In the second cylinders (14), a hydrocarbon HxCyOz is injected with a fuel pump (26) into the oxidizing mixture of atmospheric $CO_2$ and $O_2$. The hydrocarbon is injected in the desired manner and amount to regulate the diffusion combustion engine charge and in a proportion that is less than stoichiometric with $O_2$. In said second cylinders (14), a diffusion combustion cycle, a compression ignition cycle, and a cycle similar to the diesel cycle which is fundamentally performed by the $O_2$ and combustion products, that is, about 80% of the amount of air entering the engine, is performed.

The second cylinders (14) produce energy to move the first cylinders (4) that transfer air for the MIEC membrane (6) as they are coupled on the same crankshaft (25). The second cylinders (14) produce a surplus of net mechanical energy used to move the vehicle to which the engine is coupled, or the electric generator or any application requiring an input of mechanical energy through a shaft. These second cylinders (14) work as a starting system for the turbomachine assembly to start up the cycle airflow and turbines. They are moved to that end until the startup of the system by a conventional starting motor of the type used in reciprocating engines.

The transfers of heat to the water in the first WCAC cooler (3), second WCAC cooler (9), third WCAC cooler (11), and fourth WCAC cooler (13), together with the transfer of heat in the MIEC membrane (6) in the second regenerative heat exchanger (5) and first regenerative heat exchanger (23), and lastly the discharge into the atmosphere of the surplus oxidizing mixture, through the branch-off (29), represent the complete transfer of heat to the cold source necessary for the thermodynamic cycle to comply with the second law of thermodynamics and to therefore be viable. In turn, the transfers of heat in the first WCAC cooler (3), second WCAC cooler (9), third WCAC cooler (11), and fourth WCAC cooler (13) and in the regenerations (produced in the second regenerative heat exchanger (5) and first regenerative heat exchanger (23)) contribute to minimizing the destruction of exergy of the thermodynamic cycle due, on one hand, to making the overall compression process of the working fluid more isothermal and, on the other hand, to recovering the energy from exhaust gases for the separation from the air. The approximation to isothermal compression and the use of regenerative heat exchangers for extracting the heat from the $CO_2$, $N_2$, and $H_2O$ approximate the $N_2$ cycle in the MIEC membrane (6) to a cycle with a yield equal to the Carnot cycle, known as the Ericsson cycle. The cycle of the mixture of $CO_2$, $H_2O$, and $O_2$ can be assimilated to a closed Brayton cycle with intermediate compressions and expansions, but nested with a diesel cycle in the second cylinders (14), which has not been described up until now in the literature. Essentially, the quasi-closed Brayton cycle nested with the diesel cycle and binary relative to the $N_2$ cycle (by sending heat to the $N_2$ cycle, it complies with the thermodynamic principles for approximating an ideal cycle of maximum efficiency, such as the Ericsson cycle) is a novel embodiment of a binary cycle, complying with the principles of the other ideal cycle of maximum efficiency, the Carnot cycle.

Lastly, as a result of the combustion of the hydrocarbon (fuel) with the oxidizing mixture ($CO_2$, $H_2O$, $O_2$), a mixture of $CO_2$, $H_2O$, unburned THCs, and CO referred to as exhaust gas is produced at the outlet of the second cylinders (14). At the outlet of the second cylinders (14), this exhaust gas is at a maximum pressure and temperature of 0.6 MPa and 1223 K (949.85° C.) respectively. The mixture of exhaust gases is passed through the MIEC membrane (6) suctioned by compressor C1 (10), compressor C3 (12), and ultimately by the second cylinders (14) themselves. In the MIEC membrane (6), on one hand, the mixture of exhaust gases performs the function of sweeping the membrane, lowering the partial pressure of $O_2$ to improve the productivity of the MIEC membrane (6) and diluting the $O_2$ until combustion temperatures are compatible with the material technology of current RICE. On the other hand, the mixture of exhaust gases is catalyzed, reacting with the $O_2$ to convert the THCs and CO resulting from the combustion process into $CO_2$ and $H_2O$. Therefore, at the outlet of the MIEC membrane (6), the cycle is closed, and the mixture returns to the inlet of the second regenerative heat exchanger (5) so as to transmit its heat to the air.

In the described process, the engine works in an optimal manner regulating the effective compression ratio thereof with turbine VGT2 (8) to the most efficient ratio according to the degree of charge and the rotating speed of the engine. The productivity of the membrane instantaneously responds to engine accelerations since the first cylinders (4) are mechanically coupled on the same shaft with the second cylinders (14). Therefore, the dynamic response of the engine is not affected by the turbocharger acceleration lag due to the mechanical inertia thereof. Lastly, the engine only emits into the atmosphere a mixture of $CO_2$, $H_2O$, and $O_2$ trough the branch-off pipe (29), through the second check valve (19), and $N_2$+atmospheric $CO_2$ through the outlet of turbine VGT2 (8). That is, it does not emit any polluting gas which detrimentally affects people and animals. Both emissions are mixed in the same exhaust conduit (30), which pools together downstream of the second check valve (19) and turbine VGT2 (8) all the emissions from the engine into a common exhaust.

Embodiment 4: Compression Ignition (CI) Engine with a Stratified Mixture and Diffusion Combustion, with an Effective Variable Compression Ratio Controlled by the $O_2$ Production Rate; Without Polluting Gas Emissions and with Capture of $CO_2$ Produced and Removal of Atmospheric $CO_2$ Embodiment 4 is indicated for compression ignition (CI) engines with a stratified mixture (diffusion combustion), with the capture of atmospheric $CO_2$ and of the $CO_2$ produced by the engine itself. Therefore, it is within the category of engines that remove $CO_2$ from the atmosphere (emissions rate <0). For the production of net mechanical power, embodiment 4 is based on a diffusion combustion process, with self-ignition by detonation of the premixture and combustion speed controlled by the amount of movement of fuel streams (and in this case of the liquid $CO_2$) injected.

The degree of supercharging affects the percentage of the maximum torque in each regime through the effective compression ratio of the cycle. This effective compression ratio is variable and is controlled by the $O_2$ production rate in the MIEC membrane. This represents a concept of size reduction, where the cylinder capacity of the engine can be reduced and the effective compression process of the air in turbomachines and cylinders can approximate the isothermal process.

The combustion temperature is controlled by dilution of the mixture of oxidizing agent ($O_2$) and fuel (HxCyOz) with liquid $CO_2$ from combustion itself and densified to supercritical conditions. Due to the large amount of $CO_2$ needed, this represents an additional innovation, since two cycles coexist in cylinders: (i) on one hand, a supercritical $CO_2$ thermodynamic cycle performed by the $CO_2$ used to control the combustion temperature and, at the same time, (ii) a diesel cycle performed by the $O_2$ oxidizing agent and the products thereof. This has not been described until now in the published literature.

Embodiment 4 proposes capturing the $CO_2$ emitted by the engine and reducing the content of atmospheric $CO_2$ in the air used, both as efficiently as possible. Furthermore, it eliminates polluting gas (CO, THCs, PM, and NOx) emissions at the source (combustion chamber), minimizing the need for post-treatment to clean the exhaust gases, which represents considerable savings in the production cost of the engine. At present, post-treatment for cleaning gases is estimated to be in the order of 30% of the total cost of the power assembly. Additionally, oxy-combustion assures that polluting gases are not emitted during the cold starting process either. This does not occur in engines today given the time needed to heat up (activate) post-treatment systems for cleaning exhaust gases.

Figure 4A:
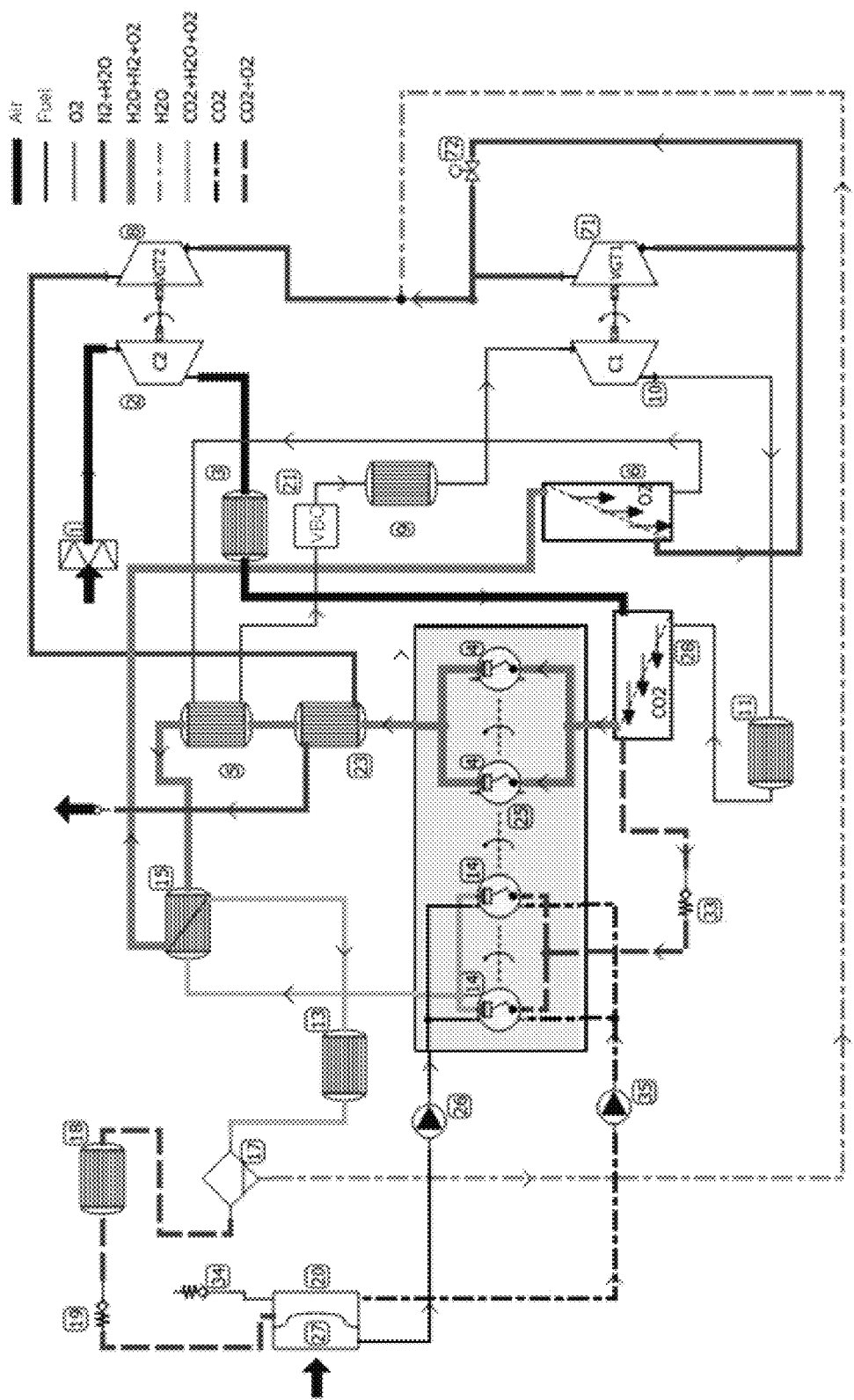
FIG. 4a shows a diagram of a diffusion oxy-combustion engine according to a fourth preferred embodiment of the present invention, with a stratified and lean mixture, high specific power, high efficiency, without the emission of gases that are harmful to health, with a MIEC to separate the $O_2$ from the air, with a polymer membrane to separate $CO_2$ from the air, and with negative net $CO_2$ emissions.
Figure 4B:
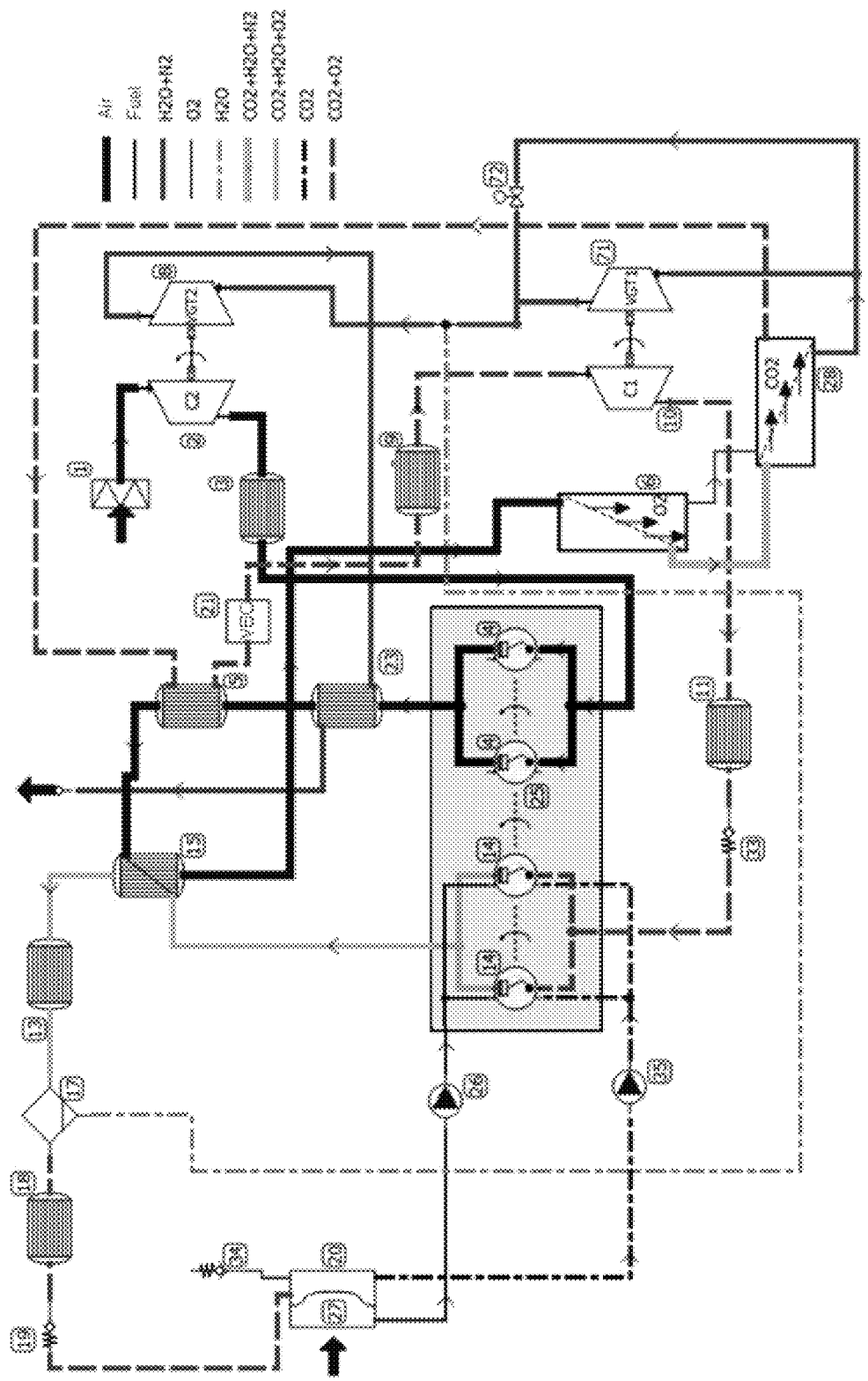
FIG. 4b shows a diagram of a diffusion oxy-combustion engine according to an alternative of the engine of FIG. 4a, with a stratified and lean mixture, high specific power, high efficiency, without the emission of gases that are harmful to health, with a MIEC to separate the $O_2$ from the air, and a membrane based on molten carbonates to separate the $CO_2$ from the air and, with negative net $CO_2$ emissions.

Embodiment 4 is depicted in FIGS. 4a and 4b. In embodiment 4, atmospheric air enters the engine through a filter (1) suctioned by a compressor (C2) (2). Compressor C2 (2) is part of a turbo assembly and is mechanically coupled to a variable geometry turbine (VGT2) (8). Compressor C2 (2) transfers air using the energy recovered by turbine VGT2 (8) of the $N_2$+$H_2O$ rejected in the MIEC membrane (6). Under rated conditions, the air at the outlet of compressor C2 (2) has a pressure and a temperature of about 0.4 MPa and 473 K (199.85° C.). The air passes through a first water-cooler of air charge (WCAC) (3) of the engine. At the outlet of the first WCAC cooler (3), the temperature drops to about 323 K (49.85° C.), which makes the subsequent compression in the first cylinders (4) of the engine more isothermal.

In the embodiment of FIG. 4a, the content of $CO_2$ in the air is reduced in a $CO_2$ polymer membrane (28) with an overall $CO_2$/$N_2$ selectivity of around 2000 at the working temperature at the outlet of the first WCAC cooler (3). This is achieved in FIG. 4a as a result of the fact that the $CO_2$ is entrained by pure $O_2$ taken downstream of the third WCAC cooler (11) and from the MIEC membrane (6) for $O_2$ separation. The $O_2$ lowers the partial pressure of the permeated atmospheric $CO_2$ in the entrainment chambers of the membrane module. In FIG. 4a, the atmospheric $CO_2$ collected and the $O_2$ used to sweep the membrane are directed to the first check valve (33) to be suctioned by the second cylinders (14).

In a second version of this embodiment shown in FIG. 4b, the $CO_2$ in atmospheric air is separated by means of a $CO_2$ membrane (28) based on molten carbonates, such that at the outlet of the first WCAC cooler (3), the air does not encounter any $CO_2$ membrane.

The air is subsequently suctioned by half of the first cylinders (4) of the engine. Embodiment 4 depicts 4-cylinder, 4-stroke engine, and there are 2 cylinders which suction the air. The first cylinders (4) act like pumps compressing the air to about 1.5 MPa and 473 K (199.85° C.). The first cylinders (4) are preferably identical to the remaining cylinders of the engine, sharing the crankshaft (25), the camshaft, and the valve timing gear, and having as a unique singularity that fuel is not injected therein. Since it is a 4-stroke engine, the air remains inside the first cylinders (4) for 4 strokes, so it is compressed and cooled with the engine cooling water (at about 363 K (89.85° C.)), which contributes to making the compression more isothermal. These first cylinders (4) work as a starting system for the turbomachine assembly to start up the cycle airflow and turbines. They are moved to that end until the startup of the system by a conventional starting motor of the type used in reciprocating engines.

At the outlet of the first cylinders (4), the air is heated in a first regenerative heat exchanger (23) which lowers its pressure to 1.47 MPa and raises its temperature to about 673 K (399.85° C.), using to that end the thermal energy from a flow of $H_2O$ and $N_2$. This flow of $N_2$ and $H_2O$ comes from turbine VGT2 (8). This flow of $N_2$ and $H_2O$ represents about 90% of the total flow volume of gases transferred by the engine and is at an approximate temperature of 800 K (526.85° C.) and a pressure of 0.1 MPa. At the outlet of the first regenerative heat exchanger (23), the air is heated in a second regenerative heat exchanger (5) which lowers its pressure to 1.45 MPa and raises its temperature to about 723 K (449.85° C.), using to that end the thermal energy from the $O_2$ produced by the MIEC membrane (6) in FIG. 4a. The thermal energy from the $O_2$ produced by the MIEC membrane (6) and the $CO_2$ produced in the $CO_2$ membrane (28) is used to that end in FIG. 4b. The temperature does not increase much because $O_2$ represents about 20% of the flow volume of the air.

At the outlet of the second regenerative heat exchanger (5), the air is heated in a catalytic MIEC membrane (15) which lowers its pressure to 1.4 MPa and raises its temperature to about 1123 K (849.85° C.), using to that end the thermal energy from exhaust gases from the combustion of the second cylinders (14). In the catalytic MIEC membrane (15), the exhaust gases transfer their heat to the air (acting like a regenerative heat exchanger) and both CO and HC (CO and HC represent less than 1% of the composition of the exhaust gases and therefore are not explicitly shown in FIGS. 4a and 4b) are oxidized until the entire gas flow is made up of only $CO_2$ and $H_2O$. This flow of $CO_2$ and $H_2O$ represents about 100% of the total flow volume of exhaust gases transferred by the engine at very high pressures (7.5 MPa), so the density thereof is greatly increased, and the size of the catalytic MIEC membrane (15) needed for the oxidation of the gases of this engine is reduced.

After the catalytic MIEC membrane (15), the air at 1.4 MPa and 1123 K (849.85° C.) is injected into the $O_2$ MIEC membrane (6) where the $O_2$ is separated.

In the case of the embodiment based on the separation of atmospheric $CO_2$ from the air by means of membranes based on molten carbonates shown in FIG. 4b, the $N_2$, $H_2O$, and atmospheric $CO_2$, which represents the rejection in the $O_2$ MIEC membrane (6), enters the $CO_2$ membrane (28) at about 1123 K (849.85° C.) and 1.35 MPa, in this case being a molten carbonate membrane with an overall $CO_2/N_2$ selectivity of around 2500 at the working temperature, where the atmospheric $CO_2$ is separated from the current of $N_2+H_2O$. To that end, the pure $O_2$ produced by the MIEC membrane (6) is used as the entrainment current. When this $O_2$ exits the MIEC membrane (6) to the second combustion cylinders (14), suctioned by the 0.05 MPa vacuum generated by compressor C1 (10), it is first passed through the atmospheric $CO_2$ side of the $CO_2$ membrane (28). The $O_2$ is thereby used to sweep the $CO_2$ from the $CO_2$ membrane (28) and lower the partial pressure of the $CO_2$.

In the first version of this embodiment, where polymer membranes are used for the separation of atmospheric $CO_2$ from the air (shown in FIG. 4a), the rejection from the $O_2$ MIEC membrane (6) does not encounter any $CO_2$ membrane downstream, because the air has already been previously treated to reduce the content of $CO_2$ in the $CO_2$ polymer membrane (28) of FIG. 4a. The rejection from the $O_2$ MIEC membrane (6) in the case of the embodiment of FIG. 4a or the rejection from the $CO_2$ membrane (28) in the embodiment of FIG. 4b are both virtually free from atmospheric $CO_2$ and mostly made up of $N_2+H_2O$ at 1.35 MPa and 1123 K (849.85° C.). These methods for separating atmospheric $CO_2$ from the treated air cause the described engine to remove $CO_2$ from the atmosphere and said engine can be considered to have a negative $CO_2$ emission rate. In fact, the content of $CO_2$ of the current of $N_2+H_2O$ emitted at the outlet of turbine VGT2 (8) is minimal (<1-5% of the air inlet content) and the $CO_2$ produced in combustion is liquefied and captured in the system, as explained below.

Each of the rejections from the membranes represents about 80% of the mass of air transferred by the system and is passed through turbine VGT1 (71) and/or through the control valve (72). Turbine VGT1 (71) and the control valve (72) are part of a turbo assembly together with compressor C1 (10), to which turbine VGT1 (71) is mechanically linked. Turbine VGT1 (71) harnesses the energy from the flow of $N_2$ rejected from the MIEC membrane (6), recovering its energy to move compressor C1 (10). The control valve (72) regulates the flow of energy to compressor C1 (10). Compressor C1 (10) transfers the pure $O_2$ produced in the MIEC membrane (6) in the case of FIG. 4a. Compressor C1 (10) transfers pure $O_2$ produced in the MIEC membrane (6)+$CO_2$ in the case of FIG. 4b. Therefore, it transfers about 20% of the airflow and controls the vacuum to be generated on the $O_2$ side of the MIEC membrane (6) to lower the pressure of $O_2$ and increase the productivity of the membrane. As a consequence, the control valve (72) regulates the $O_2$ production rate and hence the mass of $O_2$ trapped in the cycle and the maximum pressure of the cycle in the second cylinders (14).

The control valve (72) usually works being partially open so as to regulate the pressure of compressor C1 (10). A part of the $N_2$ rejected in the MIEC membrane (6) circulates through turbine VGT1 (71), being expanded and cooled. The other part of the rejected $N_2$ circulates through the actual control valve (72), without being cooled down. This other part of the $N_2$ is mixed downstream of turbine VGT1 (71) with the cold and expanded $N_2$, reheating it, and accordingly increasing its temperature.

After passing through the control valve (72) and/or through the turbine (71) the $N_2+H_2O$ rejection from the MIEC membrane (6) (80% of the airflow) is harnessed in variable geometry turbine VGT2 (8), which is used to move compressor C2 (2). The approximate rated inlet conditions relative to turbine VGT2 (8) are 0.35 MPa and 823 K (549.85° C.). The variable geometry of turbine VGT2 (8) is used to regulate the flow volume of air transferred by the MIEC membrane (6) and, therefore, the flow volume of $O_2$ produced. When turbine VGT2 (8) is closed, it increases the airflow through the MIEC membrane (6) and the working pressure in the MIEC membrane (6). Therefore, it increases the hourly production of $O_2$ (with the rate being the same) and the amount of fuel that may be injected under stoichiometric conditions. The inverse happens when turbine VGT2 (8) is opened. The minimum size (minimum opening) of turbine VGT2 (8) is chosen in accordance with the cylinder capacity of the reciprocating engine to set the maximum power of the system at each rotating speed of the engine. The maximum opening of turbine VGT2 (8) determines the minimum flow volume of $O_2$ (idle) of the reciprocating engine at each rotating speed. Turbine VGT2 (8) can also comprise a wastegate (or WG) valve. When turbine VGT2 (8) or its wastegate valve are opened to the maximum, the energy of compressor C2 (2) is reduced to zero, whereby both the working pressure of the MIEC membrane and the flow volume of transferred air are considerably reduced.

If the flow volume of the engine is to be reduced even more, until lowering it to zero, then the control valve (72) is opened, avoiding turbine VGT1 (71), so the energy of compressor C1 (10) is reduced to zero. This equals out the partial pressure of $O_2$ on both sides of the MIEC membrane (6) and cancels the $O_2$ production rate, leaving the engine charge of this embodiment 4 idle.

The control valve (72) thereby provides a qualitative regulation of the flow of $O_2$ by acting on the production rate, and turbine VGT2 (8) provides a quantitative regulation by acting on the transferred flow volume of air. Both controls provide very broad and very fine-tuned regulation of the effective compression ratio of the cylinder at top dead center of the second cylinders (14) without this changing the volumetric compression ratio thereof. This is commonly known in reciprocating engines as variable compression ratio.

At the outlet of turbine VGT2 (8), the mixture of $N_2$ and $H_2O$ at a pressure of about 0.1 MPa and temperature of about 800 K (526.85° C.) is passed through the first regenerative heat exchanger (23) to transfer its heat to the air before discharging this mixture of gases (now free from gases that are harmful to health) into the atmosphere.

The pure $O_2$ in the case of FIG. 4a or the $O_2$ diluted with atmospheric $CO_2$ in the case of FIG. 4b exit the MIEC membrane (6) and the $CO_2$ membrane (28), respectively, at a rated pressure and temperature of about 0.05 MPa and 1123 K (849.85° C.), respectively. This is the oxidizing flow, which represents about 20% of the flow volume of air transferred by the engine.

The heat of this oxidizing flow is recovered first in the second regenerative heat exchanger (5) to heat the air coming from the outlet of the first regenerative heat exchanger (23). At the outlet of the second regenerative heat exchanger (5), the $O_2$ has rated conditions of about 0.048 MPa and 700 K (426.85° C.).

Next, the mixture flows through means for carrying out a vacuum Brayton cycle (VBC) (21). The means for carrying out a vacuum Brayton cycle (VBC) (21) have the function of cooling the mixture by transforming its temperature into pressure and recovering the pressure loss caused by the second regenerative heat exchanger (5). The means for carrying out a vacuum Brayton cycle (VBC) (21) are made up of a turbine VGT3 (16) mechanically coupled with a compressor C3 (12) with which it forms a turbo assembly. Between the outlet of turbine VGT3 (16) and the inlet of compressor C3 (12) there is a fifth WCAC cooler (31). The internal detail of the means for carrying out a vacuum Brayton cycle (VBC) (21) can be seen in FIG. 5a) and the operating cycle thereof can be seen in the T-s diagram of FIG. 5b). The mixture of $CO_2$, $H_2O$, and $O_2$ is expanded so as to harness the energy thereof in turbine VGT3 (16), cooled at constant pressure in the fifth WCAC cooler (31), and compressed in compressor C3 (12), mechanically coupled with turbine VGT3 (16). At the outlet of compressor C3 (12), the mixture is colder and at a higher pressure than at the inlet of turbine VGT3 (16).

The rated conditions of the oxidizing mixture at the outlet of compressor C3 (12) are about 0.08 MPa and 473 K (199.85° C.). The oxidizing mixture, continuing its path to the second cylinders (14), is cooled in the second WCAC cooler (9) to 323 K (49.85° C.). Next, it is compressed in compressor C1 (10) to 0.25 MPa and 473 K (199.85° C.), with the conditions of compressor C1 (10) being those imposed by the control valve (72) to maintain the rate of productivity of the MIEC membrane (6), as has already been described. After compressor C1 (10), the fluid oxidizing agent is cooled again in the third WCAC cooler (11) to 323 K (49.85° C.).

In the embodiment of FIG. 4a, the fluid oxidizing agent is pure $O_2$ and is used to entrain the $CO_2$ in the $CO_2$ polymer membrane (28) with a $CO_2/N_2$ selectivity of around 2000 to lower the partial pressure of the $CO_2$ on this side and maximize the efficacy of the membrane to remove $CO_2$ from the air current. In the embodiment of FIG. 4b, the fluid oxidizing agent is now $O_2$ diluted with atmospheric $CO_2$ at the outlet of the third WCAC cooler (11).

Next, the fluid oxidizing agent passes through a first check valve (33) to prevent the outlet of backflows from the second cylinders (14). After the first check valve (33), the mixture is suctioned by the second cylinders (14), which are 2 of the 4 in the four-stroke engine used as an example, as established at the beginning of the description of the present embodiment 4.

In the second cylinders (14), a hydrocarbon HxCyOz is injected with a fuel pump (26) into the oxidizing mixture of $O_2$ (together with the $CO_2$ from the air). The fuel pump (26) suctions the fuel from a second tank (27), which is separated with a flexible membrane from the first tank (20) where liquid $CO_2$ is accumulated, as will be explained below. As the hydrocarbon accumulated in the second tank (27) is gradually consumed, the membrane reduces the volume on the hydrocarbon side and increases the volume on the $CO_2$ side to allow the accumulation of the latter on its side of the first tank (20). The hydrocarbon suctioned by the fuel pump (26) is injected into the second cylinders (14) in the desired manner and amount to regulate the diffusion combustion engine charge and in a proportion that is less than stoichiometric with $O_2$. In said second cylinders (14), a diffusion combustion cycle, a compression ignition cycle, and a cycle similar to the diesel cycle which is fundamentally performed by the $O_2$ and combustion products, that is, 20% of the mass circulating through the engine, is performed.

To regulate the combustion temperature to limits compatible with material and cooling technologies of reciprocating engines, it is necessary to inject large amounts of liquid $CO_2$ into the second cylinders (14). This amount is about 80% of the mass transferred by the second cylinders (14) and is injected by the liquid $CO_2$ pump (35) at a temperature less than the critical temperature (<303 K (29.85° C.)) and at high pressure (about 80 MPa) inside the cylinders. The $CO_2$ is kept at subcritical temperatures (<303 K (29.85° C.)) in the pump using, if necessary, a cooling circuit such as the one produced by the air conditioning of the vehicle. The injected $CO_2$ has been previously captured and liquefied in previous combustion processes. The $CO_2$ evaporates inside the second cylinders and is expanded performing a supercritical thermodynamic cycle other than that of $O_2$ and the products thereof, which will be described below.

The second cylinders (14) produce energy to move the first cylinders (4) that transfer air for the MIEC membrane (6) and to compress the $CO_2$ during discharge to the supercritical pressure since they are all coupled on the same crankshaft (25). The productivity of the membrane instantaneously responds to engine accelerations since the first cylinders (4) are mechanically coupled on the same shaft with the second cylinders (14). Therefore, the dynamic response of the engine is not affected by the turbocharger lag (due to the mechanical inertia thereof) as occurs in conventional turbosupercharged engines. The second cylinders (14) furthermore produce a surplus of net mechanical energy used to move the vehicle to which the engine is coupled, or the electric generator or any application requiring an input of mechanical energy through a shaft. These second cylinders (14) work as a starting system for the turbomachine assembly to start up the cycle airflow and turbines. They are moved to that end until the startup of the system by a conventional starting motor of the type used in reciprocating engines.

The transfers of heat to the water of the first WCAC cooler (3), second WCAC cooler (9), third WCAC cooler (11), fourth WCAC cooler (13), fifth WCAC cooler (31), and sixth WCAC cooler (18); together with the transfer of heat in the MIEC membrane (6) and in the catalytic MIEC membrane (15); in the regenerative heat exchangers second (5) and first (23) and lastly the remaining densification and capture of the surplus $CO_2$ and $H_2O$, represent the complete transfer of heat to the cold source necessary for the thermodynamic cycle to comply with the second law of thermodynamics and to therefore be viable. In turn, transfers of heat in the first WCAC cooler (3), second WCAC cooler (9), third WCAC cooler (11), fourth WCAC cooler (13), fifth WCAC cooler (31), and sixth WCAC cooler (18) and in the regenerations (produced in the second regenerative heat exchanger (5) and first regenerative heat exchanger (23)) contribute to minimizing the destruction of exergy of the thermodynamic cycle due, on one hand, to making the overall compression process of the working fluid more isothermal and, on the other hand, to recovering the energy from exhaust gases for the separation from the air. The approximation to isothermal compression and the use of second regenerative heat exchanger (5) and first regenerative heat exchanger (23) for extracting the heat from the $O_2$ and from $CO_2+H_2O$ approximate the air and $N_2$ cycle in the MIEC membrane (6) to a cycle with a yield equal to the Carnot cycle known as the Ericsson cycle. The cycle of the mixture of $O_2$ can be assimilated to a supercritical $CO_2$ cycle with intermediate compressions and expansions but nested with a diesel cycle in the second cylinders (14), which has not been described up until now in the literature. Essentially the supercritical $CO_2$ cycle nested with the diesel cycle and binary relative to the $N_2$ cycle (by sending heat to the $N_2$ cycle, it complies with the thermodynamic principles for approximating an ideal cycle of maximum efficiency, such as the Ericsson cycle) is a novel embodiment of a binary cycle, complying with the principles of the other ideal cycle of maximum efficiency, the Carnot cycle.

As a result of the combustion of the hydrocarbon (fuel) with the oxidizing mixture (atmospheric $CO_2+O_2$), a mixture of $CO_2$, $H_2O$, unburned THCs, $O_2$, and CO is produced at the outlet of the second cylinders (14). This mixture is oxidized with the $O_2$ left over from combustion in the catalytic MIEC membrane (15) which it enters at an approximate temperature of 1273 K (999.85° C.) and a pressure of 7.5 MPa. The gases transfer their heat to 100% of the airflow transferred by the engine, whereby its temperature drops considerably to about 753 K (479.85° C.). At the same time, and due to the chemical reactions that are produced in the catalytic MIEC membrane (15), the CO and THCs are oxidized with the $O_2$ left over from combustion to $H_2O$ vapor and $CO_2$, and, again, due to oxy-combustion the production of NOx in the second cylinders (14) is prevented. Since the ratio of $O_2$ taken in and the fuel in the second cylinders (14) is not stoichiometric, but rather higher, as an option for regulating the charge, there can be $O_2$ left over even after oxidizing the CO and THCs.

The pressure of 7.5 MPa is regulated by the second check valve (19) and its setting spring. Compression is performed instantaneously upon opening the exhaust valve of the second cylinders (14) and discharging the mixture of exhaust gases. The gases compressed to the 7.5 MPa must be kept above 573 K (299.85° C.), which is the saturation temperature of water at 7.5 MPa, to assure that said mixture is still in a gas state inside the second cylinders (14).

The mixture is cooled in the fourth WCAC cooler (13) to 523 K (249.85° C.) for the $H_2O$ to transition to a liquid state. Next, the liquid water is separated from the $CO_2$ gas in a separator (17), which can be an inertial separator with a pressure lamination valve at the outlet. A polymer membrane can also be used as a separator (17) if the water is kept in a gas state. The mass of water at 7.5 MPa and 473 K (199.85° C.) represents about 10% of the total flow volume of mass transferred by the engine. The separated water is mixed with the $N_2+H_2O$ at the inlet of turbine VGT2 (8). Pressure downstream of the separator (17) is thereby set by the expansion in turbine VGT2 (8). This allow harnessing the energy from the temperature and the mass of the extracted water, recovering part of the energy thereof in turbine VGT2 (8).

Lastly, the $CO_2+O_2$ residues are cooled in the sixth WCAC cooler (18) below 303 K (29.85° C.), which is the critical temperature thereof. The liquid $CO_2$ passes through the second check valve (19) and is stored at 7.5 MPa in a first tank (20) with controlled temperature below 303 K (29.85° C.). The tank is kept at subcritical temperatures of $CO_2$ (<303 K (29.85° C.)) using, if necessary, a cooling circuit such as the one produced by the air conditioning of the vehicle. The $O_2$ gas that may have been accumulated in the tank is purged into the atmosphere through a fourth check valve (34) when the pressure in the tank exceeds 7.5 MPa. When the fuel of the second tank (27) is emptied or the first tank (20) is filled, whichever happens first, engine autonomy ends. Both tanks are separated by a flexible membrane. The $CO_2$ is discharged from the first tank (20) in the service station, being exchanged for fuel filling the second tank (27). The liquid $CO_2$ can again be converted into a hydrocarbon or be stored in controlled catch basins, but it is not emitted into the atmosphere. The reduction of the content of $CO_2$ at the intake air together with the capture of $CO_2$ generated in oxy-combustion processes allow determining that the present embodiment 4 is an engine with negative net emissions as it has removed atmospheric $CO_2$ and has not emitted the $CO_2$ produced in its combustion process.

Figure 6:
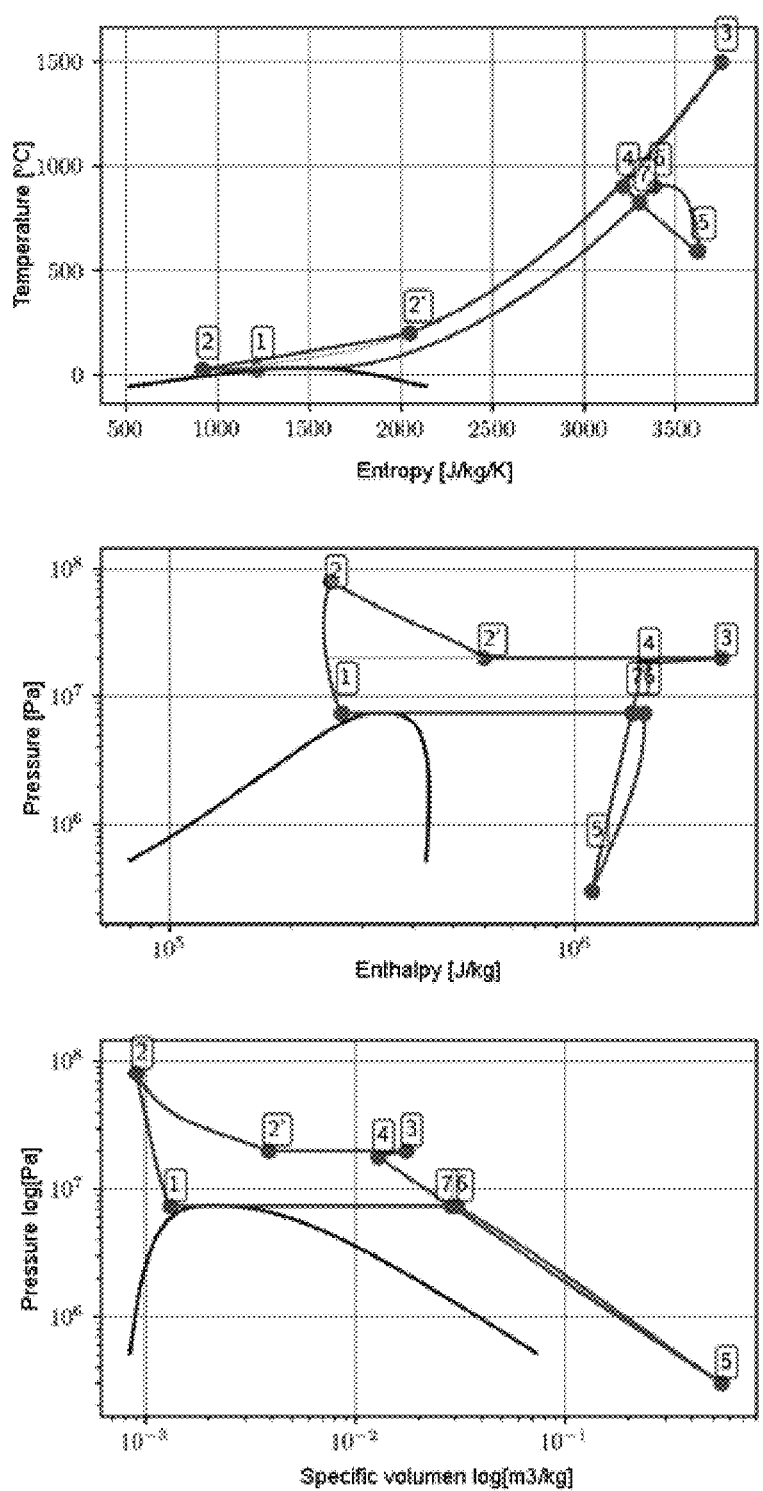
FIG. 6 shows a supercritical $CO_2$ cycle nested with the $O_2$ diesel cycle corresponding to embodiment 4 of FIGS. 4a and 4b.

Since the liquid $CO_2$ is injected again into the second cylinders (14) with the $CO_2$ pump (35) and to keep combustion temperatures controlled, a novel thermodynamic cycle not described up until now and depicted in FIG. 6 in the p-h; T-s and p-v diagrams, respectively, is performed. This cycle is relevant in terms of energy due to the $CO_2$, which represents about 80% of the mass contained in the cylinders. The description of the $CO_2$ cycle is as follows:

(1).—Station corresponding to the inlet of the pump. At the inlet of the $CO_2$ pump (35), $CO_2$ is at thermodynamic conditions of about 7.5 MPa and 298 K (24.85° C.).

(2).—Station corresponding to the outlet of the pump. At the outlet of the $CO_2$ pump (35), $CO_2$ is at thermodynamic conditions of about 80 MPa and 303 K (29.85° C.). The process between the stations (1) and (2) is performed in the $CO_2$ pump and during such process, the $CO_2$ is kept in a liquid state, being compressed in the pump in a virtually isothermal manner. The $CO_2$ is kept at subcritical temperatures (<303 K (29.85° C.)) during compression using, if necessary, a cooling circuit such as the one produced by the air conditioning of the vehicle. The station (2') of FIG. 6 corresponds to the moment when liquid $CO_2$ exits the injector nozzle and is expanded to the pressure in the second cylinders (14) of about 20 MPa.

(3). —Station corresponding to the end of the hydrocarbon combustion process. In station (3), cycle maximum temperature and maximum pressure are reached. The conditions are about 1800 K (1526.85° C.) and 20 MPa. The process is performed in the second cylinders (14). The $CO_2$ is injected together with the hydrocarbon at the end of the compression stroke. The $CO_2$ is expanded as soon as it is injected from 80 MPa upstream of the injection nozzle to 20 MPa of maximum pressure in the second cylinders (14). The pressure in the second cylinders (14) is kept virtually constant at 20 MPa during the process between stations (2') and (3) as a result of the continued injection of $CO_2$ and despite the expansion stroke. The temperature increases to 1800 K (1526.85° C.) as a result of hydrocarbon combustion.

(4). —Station corresponding to the end of the $CO_2$ injection process. The process between (3) and (4) represents a temperature reduction at a slightly decreasing pressure. The conditions in (4) are 1173 K (899.85° C.) and 18 MPa. The temperature has dropped due to dilution of the combustion products with the injected $CO_2$. The pressure has dropped due to the absence of combustion and the increase in volume in the cylinder during the process between (3) and (4).

(5). —Station corresponding to the bottom dead center of the cylinders. The process between (4) and (5) represents a continuation of the increase of volume in the cylinders without combustion and without injection of $CO_2$. This represents a cooling and a drop of pressure. The conditions in (5) are about 873 K (599.85° C.) and 0.3 MPa. The process between (4) and (5) continues to occur in cylinders with closed valves, so it is a system that is isolated from the outside. In (5), volumetric expansion in the cylinders ends, the exhaust valve is opened, and the exhaust gas or discharge process begins.

(6). —Station corresponding to the end of the exhaust process. When the exhaust valve is opened, instantaneous recompression of the gas in the cylinders occurs because the discharge area is pressurized at 7.5 MPa by the second check valve (19). The process between (5) and (6) represents an instantaneous increase in pressure and temperature to about 7.5 MPa and 1273 K (999.85° C.).

The cycle is closed in a cooling process at the constant pressure of 7.5 MPa, in which the $CO_2$ transitions from the gas state to the liquid state following the supercritical pressure line. At this cycle close, it returns again to the station (1) under the initial conditions of 298 K (24.85° C.) and 7.5 MPa. This cooling process takes place in part in the cylinders during the exhaust gas discharge process, under constant pressure conditions, for the entire time the exhaust valve is open. The remaining cooling is produced in the catalytic MIEC membrane (15) and in the fourth WCAC cooler (13) and sixth WCAC cooler (18). Part of the mass of liquefied $CO_2$ is reinjected into the cylinders in order to perform the described cycle again, and the leftover $CO_2$ is accumulated in the first tank (20) until being delivered to suitable collection and treatment stations.

The thermodynamic state where the process line between thermodynamic states (4) and (5) crosses the process line between thermodynamic states (6) and (1) is point (7), as shown in FIG. 6. The thermodynamic state of point (7) depends on the particular conditions of the cycle and establishes the separating vertex between the part of the cycle that produces positive net mechanical work (1.2.3.4.7.1) and the part of the cycle that produces negative net mechanical work (7.5.6.7), i.e., it consumes work.

Although the $CO_2$ represents about 80% of the mass released by the cylinders, there is another approximately 20% of mass that is the $O_2$ reacting with the fuel. The cycle performed by the $O_2$ and the combustion products thereof are nested with the $CO_2$ cycle inside the second cylinders (14). Since it is a cycle that has not been proposed until now in the literature, it is also described in detail in FIG. 7. The steps of this cycle are as follows:

(a). —Station corresponding to the thermodynamic conditions at the intake of the second cylinders (14). These conditions are located downstream of the first check valve (33). The thermodynamic conditions are about 0.3 MPa and 323 K (49.85° C.). In this instant, the pistons of the second cylinders (14) are located at bottom dead center. The intake valve of the second cylinders (14) is closed and the $O_2$ compression process starts.

(b). —Station corresponding to the thermodynamic conditions at the end of the compression process of the second cylinders (14). These conditions occur at top dead center of the piston of the second cylinders (14). The thermodynamic conditions are about 11 MPa and 573 K (299.85° C.). In the process between states (a) and (b), there occurs polytropic compression, with the transmission of heat to the walls of the cylinders, of the $O_2$ trapped thereon (about 20% of the mass of the cycle). Under conditions (b), the injection of combustible hydrocarbon and the $CO_2$ in liquid state starts.

(c). —Station corresponding to the thermodynamic conditions at the end of the combustible hydrocarbon combustion process. These conditions occur after the top dead center of the piston of the second cylinders (14). The thermodynamic conditions are about 200 MPa and 1800 K (1526.85° C.). The process between (b) and (c) involves the injection of fuel, compression self-ignition, and diffusion combustion thereof, with the combustion speed being controlled as a result of the amount of movement of the injected streams. The process between (b) and (c) also involves the start of the injection of liquid $CO_2$ which is going to control the temperature of the combustion process and help to keep the pressure constant and equal to about 200 MPa as established. These conditions coincide with the conditions of thermodynamic state (3) of the $CO_2$ cycle of FIG. 6. Under these conditions, both ($O_2$ and $CO_2$) cycles occur in unison.

Figure 7:
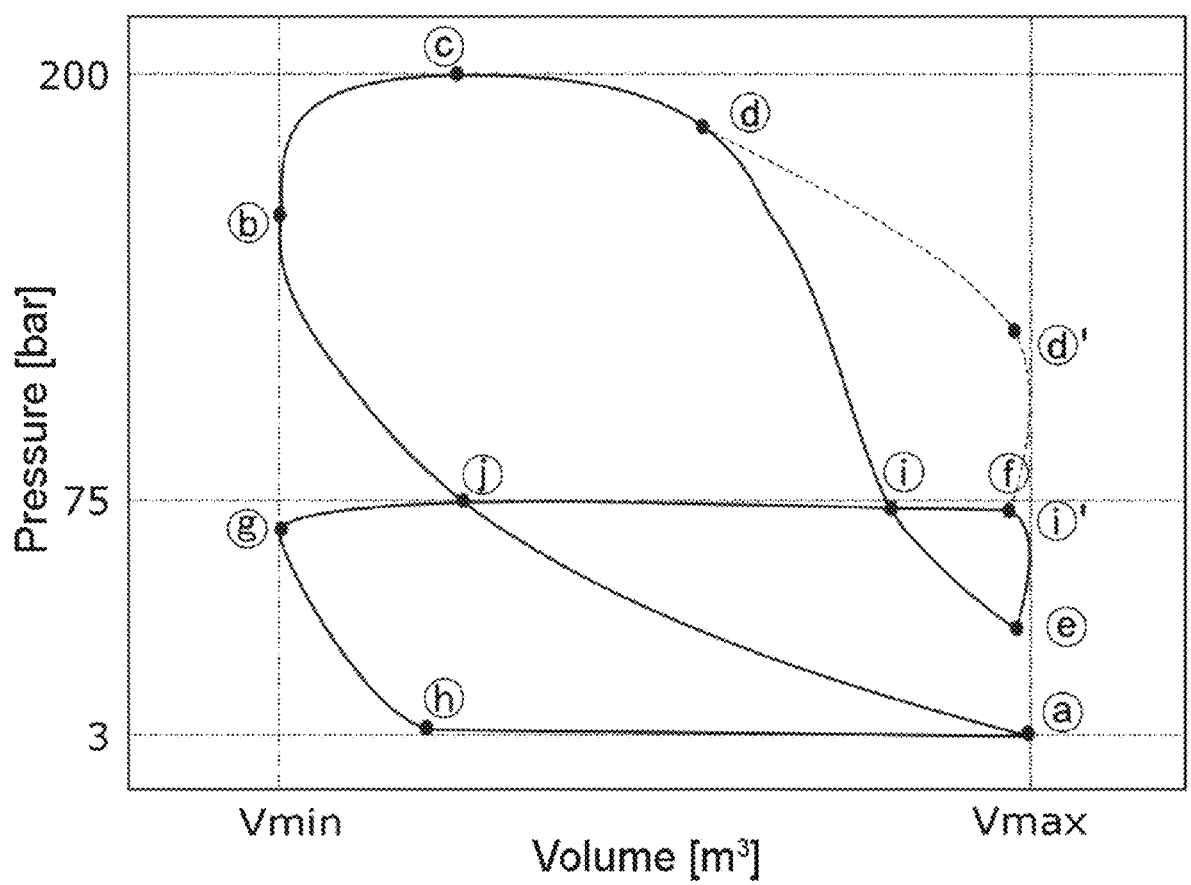
FIG. 7 shows an $O_2$ diesel cycle nested with the Brayton compression cycle with intermediate cooling corresponding to embodiment 4 of FIGS. 4a and 4b.
Figure 8:
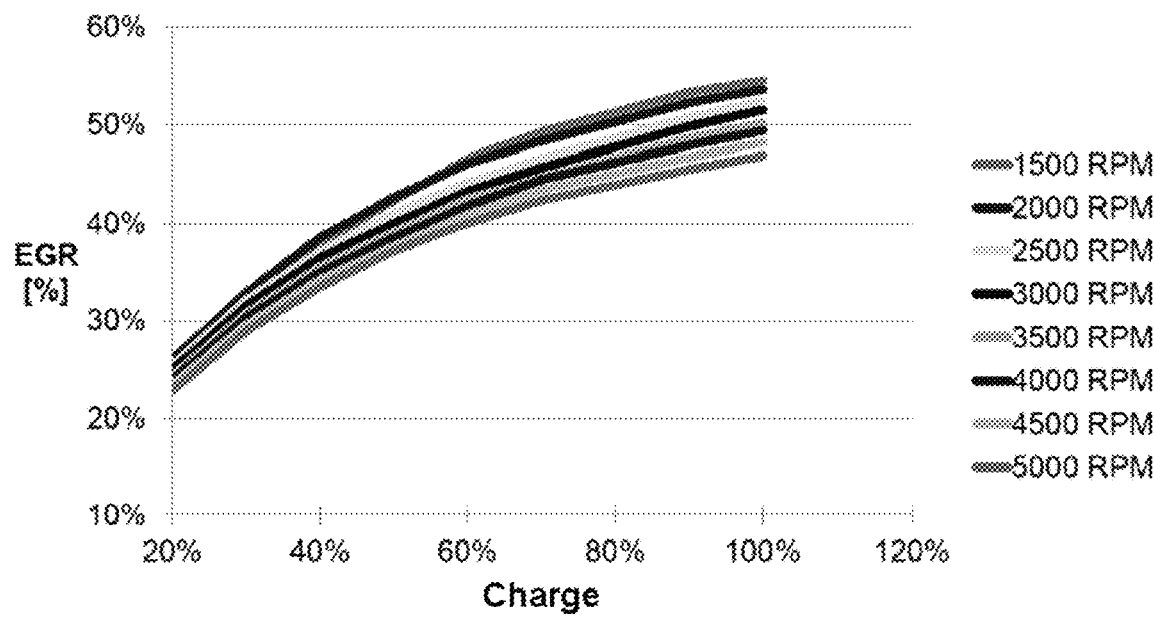
FIG. 8 shows a graph of the regulation of the combustion temperature for different degrees of charge and based on the EGR rate, that is, for an engine according to the embodiment of FIG. 1.
Figure 9:
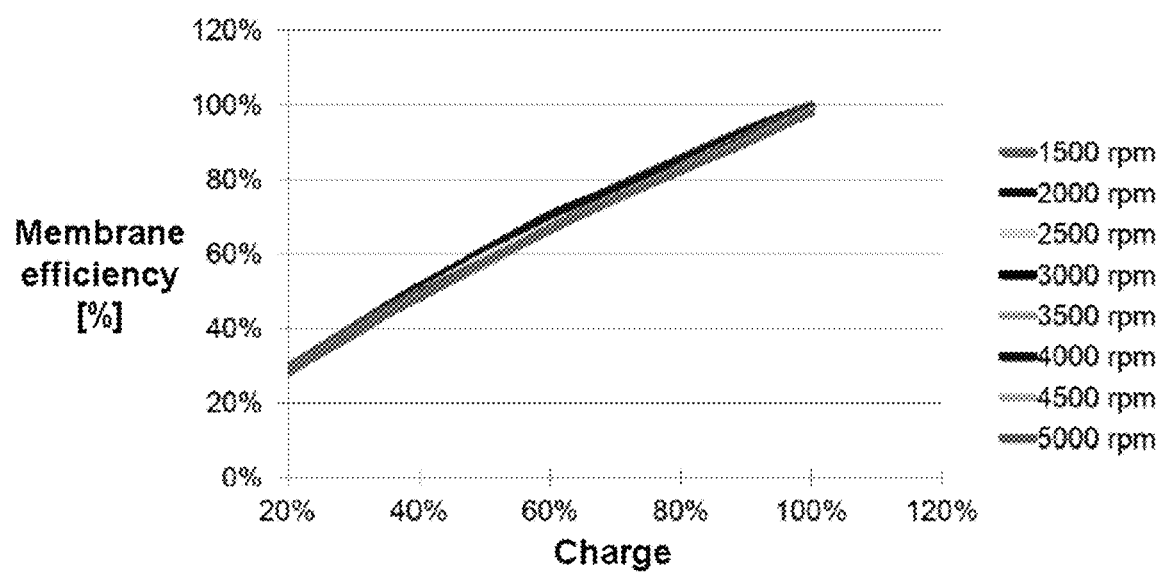
FIG. 9 shows a graph of the efficiency of the MIEC during regulation of the combustion temperature for different degrees of charge, that is, for an engine according to the embodiment of FIG. 1.
Figure 10:
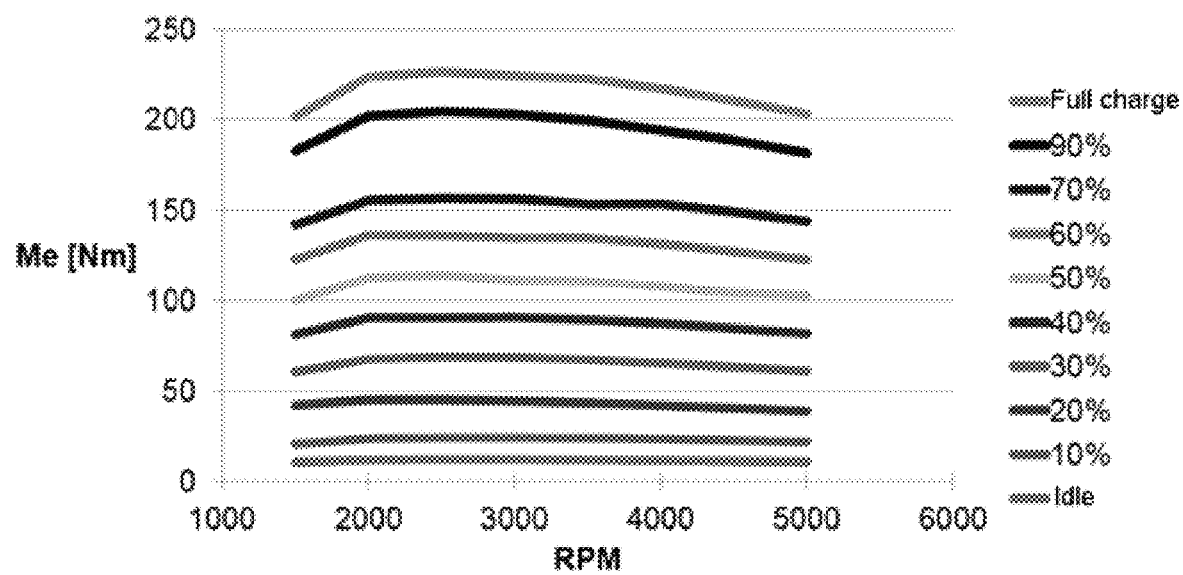
FIG. 10 shows a graph of the effective torque at full charge and at partial charges for an engine according to the embodiment of FIG. 1.
Figure 11:
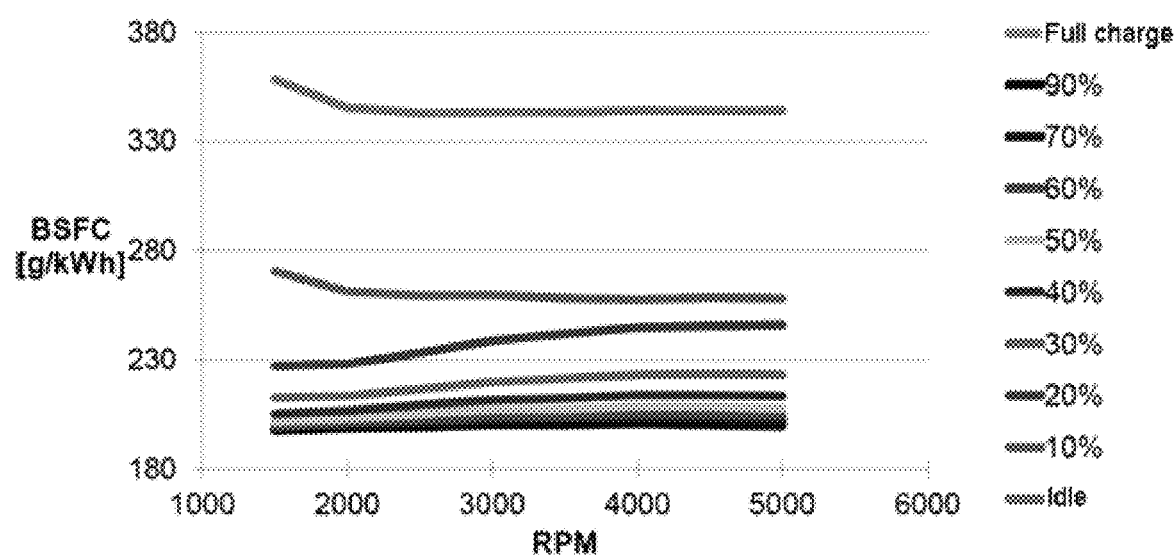
FIG. 11 shows a graph of the specific consumption at full charge and at partial charges for an engine according to the embodiment of FIG. 1.
Figure 12:
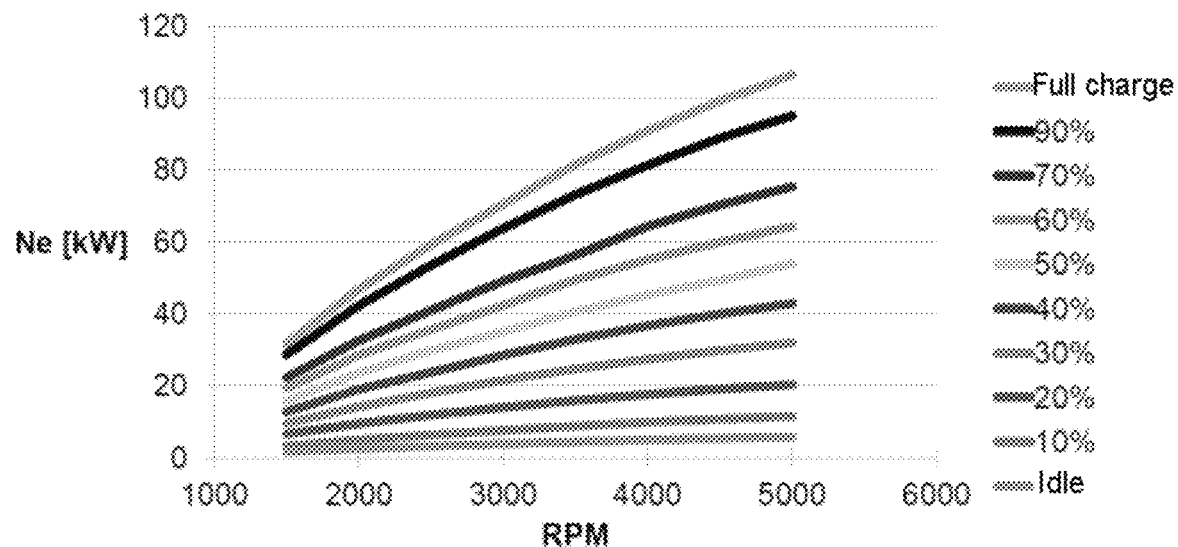
FIG. 12 shows a graph of the effective power at full charge and at partial charges for an engine according to the embodiment of FIG. 1.
Figure 13:
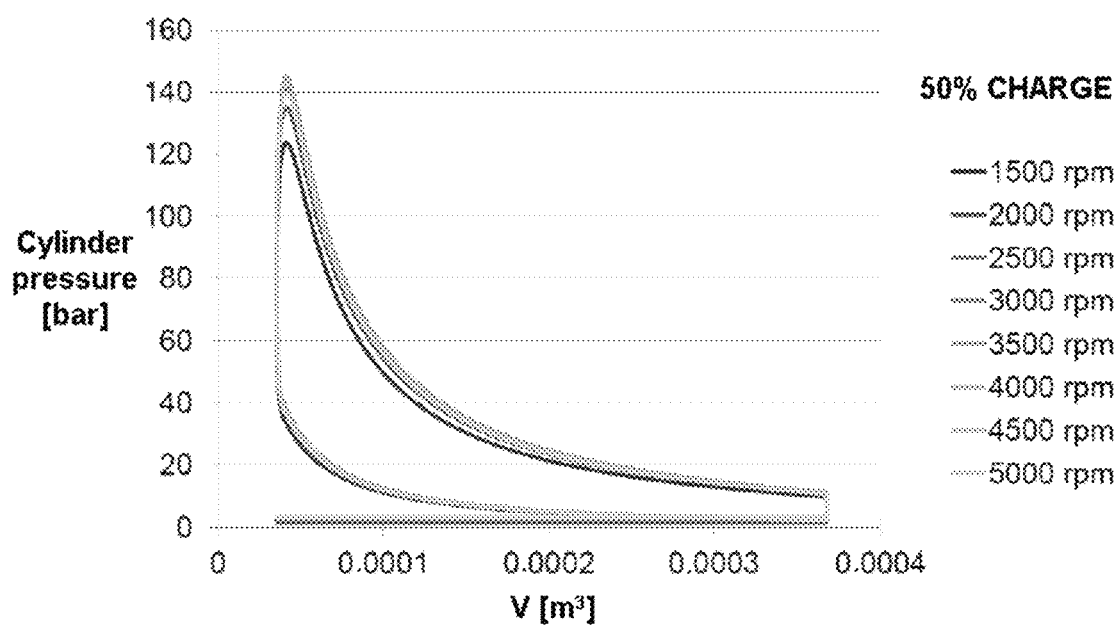
FIG. 13 shows a graph of the results of the cycle inside the combustion cylinder for an engine according to the embodiment of FIG. 1.

(d). —Station corresponding to the thermodynamic conditions at the end of the $CO_2$ injection process. These conditions occur during the expansion stroke of the piston of the second cylinders (14). The thermodynamic conditions are about 1173 K (899.85° C.) and 18 MPa. These conditions coincide with the conditions of thermodynamic state (4) of the $CO_2$ cycle of FIG. 6. Under these conditions, both ($O_2$ and $CO_2$) cycles occur in unison. The process between states (c) and (d) of FIG. 7 is identical to that described in FIG. 6 between states (3) and (4). The process is more or less prolonged depending on the amount of $CO_2$ injected, which in turn depends on the desired final temperature in the combustion products and on the stability of the combustion. An ideal case, depicted in FIG. 7 by point (d'), would be to prolong this process to the bottom dead center of the expansion stroke. This case is ideal as it would represent the maximum working production in the $O_2$ and $CO_2$ cycles.

(e). —Station corresponding to the thermodynamic conditions at bottom dead center of the stroke of the piston of the second cylinders (14). These conditions occur at the end of the expansion process in the second cylinders (14). The thermodynamic conditions are about 873 K (599.85° C.) and 0.3 MPa. These conditions coincide with those of thermodynamic state (5) of the $CO_2$ cycle of FIG. 6. Under these conditions, both ($O_2$ and $CO_2$) cycles occur in unison. The process between states (d) and (e) of FIG. 7 is identical to that described in FIG. 6 between states (4) and (5).

(f). —Station corresponding to the thermodynamic conditions upon opening the exhaust valve at bottom dead center of the stroke of the piston of the second cylinders (14). When the exhaust valve is opened, instantaneous recompression of the gas in the cylinders occurs because the discharge area is pressurized at 7.5 MPa by the second check valve (19). These conditions coincide with those of thermodynamic state (6) of the $CO_2$ cycle of FIG. 6. Under these conditions, both ($O_2$ and $CO_2$) cycles occur in unison. The process between states (e) and (f) of FIG. 7 is identical to that described in FIG. 6 between states (5) and (6). The process between (e) and (f) represents an instantaneous increase in pressure and temperature to about 7.5 MPa and 1273 K (999.85° C.).

(g). —Station corresponding to the thermodynamic conditions when combustion gas discharge has completed, at top dead center of the exhaust stroke of the piston of the second cylinders (14). In the process between stations (f) and (g), the gas is also discharged from the cylinders, under constant pressure conditions, for the entire time the exhaust valve is open until it is closed. The thermodynamic conditions are about 7.5 MPa and 1173 K (899.85° C.). Under these conditions, both ($O_2$ and $CO_2$) cycles occur in unison. The process between states (f) and (g) of FIG. 7 coincide during a certain stretch at constant pressure with that described in FIG. 6 between states (6) and (1). In this station, the $O_2$ and $CO_2$ cycles are separated again.

(h). —Station corresponding to the end of the pressure drop process in the second cylinders (14) to the intake pressure, downstream of the first check valve (33). This station occurs at some point of the intake stroke of the second cylinders (14). In the process between (g) and (h), the $CO_2$ trapped in the dead volume of the combustion chamber has been expanded to the conditions under which the first check valve (33) is opened. This process occurs with the first check valve (33) closed. This process is performed only by the $CO_2$ coming from the combustion of the $O_2$ and exclusively from the cycle of FIG. 7 and is independent of the $CO_2$ cycle described in FIG. 6. The thermodynamic conditions are about 0.3 MPa and 773 K (499.85° C.).

The cycle is closed again under thermodynamic conditions (a) of FIG. 7. The process between (h) and (a) occurs with the first check valve (33) open at essentially constant pressure and temperature conditions of about 0.3 MPa and 323 K (49.85° C.). The process between (h) and (a) consists of the intake of $O_2$ from the intake of the cylinders and represents the inlet of about 20% of the mass of air of the system.

The thermodynamic state where the process line between thermodynamic states (d) and (e) crosses the process line between thermodynamic states (f) and (g) is point (i), as shown in FIG. 7. The point (i) coincides with thermodynamic state (7) in FIG. 6. The thermodynamic state of point (i) depends on the particular conditions of the cycle of FIG. 7 and establishes the separating vertex between the part of the cycle that produces positive net mechanical work (i,j,b,c,d,i) and a part of the cycle that produces negative net mechanical work (i,e,f,i), i.e., it consumes work, as described in FIG. 6. As described above, point (d') of FIG. 7 represents an ideal situation of the described cycle in which points (f) and (i') coincide. In this case, the area (i',f,e,i') is zero, and the net work produced, which is understood as the absolute difference between positive work and negative work, is therefore maximized.

In the $O_2$ cycle of FIG. 7, there is another area that consumes work the vertex of which is point (j). As shown in FIG. 7, point (j) is the thermodynamic state where the process line between thermodynamic states (a) and (b) crosses the process line between thermodynamic states (f) and (g). The thermodynamic state of point (j) depends on the particular conditions of the cycle of FIG. 7 and establishes the separating vertex between the part of the cycle that produces positive net mechanical work (i,j,b,c,d,i) and the other part of the cycle that produces negative net mechanical work (j,g,h,a,j), i.e., it consumes work.

A theoretical predesign modeling was done, and a number of calculations based on same were performed, the results of which are shown in the graphs of attached FIGS. 8 to 13. Ideal connections between elements and constant efficiency of the turbomachinery and of the heat exchangers at any operation point were assumed for the model.

A constant trapped air mass and variable rate of gaseous fuel injection into the cylinders of the engine and in the compressor, as well as a stoichiometric air/fuel ratio were also assumed. The fuel considered was $C_8H_{18}$ (PCI ~42 MG/kg).

A maximum compression ratio of the turbochargers fixed at 4:1, a maximum coolant temperature of 90° C., and a maximum exhaust gas temperature of 1055° C. were imposed.

As can be observed from the graphs of FIGS. 8 to 13 and from the preceding description, with the present invention NOx emissions are prevented and the possibility of sequestering $CO_2$ instead of emitting it into the atmosphere is provided. Furthermore, charge is regulated without the need for a butterfly valve in the intake line, and a high efficiency and specific power per unit of cylinder capacity is obtained.

Although a detailed description of preferred embodiments of the present invention has been provided, one skilled in the art will understand that modifications and variations can be applied thereto without departing from the scope of protection defined exclusively by the attached claims.

The invention claimed is:

1. An internal combustion engine of a type that suctions atmospheric air as an oxidizing agent and uses hydrocarbons as a fuel, the engine comprising:
   a first regenerative Brayton cycle of air compressions with intermediate cooling and nitrogen expansions with reheating by mixing a part of the nitrogen, comprising a MIEC membrane that separates $O_2$ from the compressed air, such that the suctioned air current is free from $N_2$, and a depleted air from a rejection from the MIEC membrane is sent directly to an exhaust gas current, preventing the depleted air from participating in a subsequent combustion, in which part of the air compressions are performed in at least one first cylinder of the engine;
   a second Brayton cycle with compression with intermediate cooling, combined in a binary manner with the first Brayton cycle and nested with a cycle selected from an Otto cycle and a diesel cycle performed by oxy-combustion in at least one second cylinder of the engine,
   wherein the second Brayton cycle transmits mechanical energy, by a coupling of the at least one first cylinder with the at least one second cylinder through a crankshaft, and wherein the second Brayton cycle transmits thermal energy from exhaust gases to the first Brayton cycle;
   wherein the first Brayton cycle provides compressed $O_2$ from the MIEC membrane to the second Brayton cycle;

whereby an NOx emission into the atmosphere is prevented by a separation of $N_2$ in the MIEC membrane.

2. The engine according to claim 1, wherein the engine comprises two first cylinders and two second cylinders.

3. The engine according to claim 1, wherein a net mechanical energy produced by the first Brayton cycle is used to supercharge the second Brayton cycle through a compressor.

4. The engine according to claim 1, wherein the MIEC membrane produces pure $O_2$ separated from atmospheric air.

5. The engine according to claim 4, wherein the engine further comprises a vacuum Brayton cycle (VBC) to more intensely cool the pure $O_2$ before a subsequent compression.

6. The engine according to claim 1, wherein the MIEC membrane produces $O_2$ diluted with $CO_2$.

7. The engine according to claim 6, wherein the $CO_2$ with which the $O_2$ is diluted is obtained from atmospheric air.

8. The engine according to claim 6, wherein the $CO_2$ with which the $O_2$ is diluted is produced by combustion with a hydrocarbon in the second Brayton cycle.

9. The engine according to claim 6, wherein the engine further comprises a vacuum Brayton cycle (VBC) to more intensely cool the $O_2$ diluted with $CO_2$ before a subsequent compression.

10. The engine according to claim 1, wherein there is always a cooling step after a compression step.

11. The engine according to claim 1, wherein heat is recovered from all residual sources by combining the first Brayton cycle and the second Brayton cycle performing regenerations before cooling.

12. The engine according to claim 1, wherein mechanical energy produced by the second Brayton cycle is further used to compress produced $CO_2$ until liquefying the produced $CO_2$.

13. The engine according to claim 12, wherein the second Brayton cycle is nested with the Otto cycle, wherein the engine comprises at least one additional piston as well as first and second check valves at an inlet and downstream of the inlet to suction and compress excess $CO_2$ accumulated in conduits of the engine.

14. The engine according to claim 12, wherein the second Brayton cycle is nested with the diesel cycle, wherein an exhaust stroke of the at least one second cylinder is used to compress $CO_2$, by use of the first check valve and the second check valve allowing discharge of $CO_2$ and intake of substantially pure $O_2$, with the substantially pure $O_2$ being used as an entrainment gas in $CO_2$ selective separation membranes.

15. The engine according to claim 12, wherein the engine comprises a first tank for storing the liquefied $CO_2$ produced.

16. The engine according to claim 15, wherein $CO_2$ stored in the first tank is used to pump fuel from a second tank to the at least one second cylinder of the engine and both the first tank and the second tank are in one tank separated by a flexible membrane.

17. The engine according to claim 1, wherein the MIEC membrane is based on crystalline ceramic materials having mixed oxygen ionic-electronic carrier conduction.

18. The engine according to claim 1, wherein the engine is a spark ignition (SI) engine, turbo assemblies are used to supercharge the at least one first cylinder, and regulation of $O_2$ production of the MIEC membrane is used to regulate a charge of the engine.

19. The engine according to claim 1, wherein the engine is a compression ignition (CI) engine, turbo assemblies are used to supercharge the at least one first cylinder and regulation of $O_2$ production of the MIEC membrane is used to regulate an effective compression ratio of a working fluid in a cycle of the engine.

20. An operating method for the internal combustion engine of claim 1, the method comprising:
- a first regenerative Brayton cycle of air compressions with intermediate cooling and nitrogen expansions with reheating by mixing a part of the nitrogen, comprising separating $O_2$ from compressed air such that a suctioned air current is free from $N_2$, and a depleted air from a rejection of a separation is sent directly to an exhaust gas current, preventing participation of the depleted air in a subsequent combustion;
- a second Brayton cycle with compression with intermediate cooling, combined in a binary manner with the first Brayton cycle and nested with a cycle selected from an Otto cycle and a diesel cycle performed by oxy-combustion,
- wherein the second Brayton cycle transmits mechanical energy and thermal energy from exhaust gases to the first Brayton cycle;
- wherein the first Brayton cycle provides compressed $O_2$ from the separation to the second Brayton cycle;
- whereby NOx emission into the atmosphere is prevented by a separation of $N_2$.

* * * * *